US012670935B2

(12) United States Patent
Ou et al.

(10) Patent No.: US 12,670,935 B2
(45) Date of Patent: Jun. 30, 2026

(54) SCRATCHPAD CREATION METHOD AND ELECTRONIC DEVICE

(71) Applicant: VIVO MOBILE COMMUNICATION CO., LTD., Guangdong (CN)

(72) Inventors: Zhiming Ou, Guangdong (CN); Kun Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 204 days.

(21) Appl. No.: 17/951,258

(22) Filed: Sep. 23, 2022

(65) Prior Publication Data

US 2023/0015943 A1     Jan. 19, 2023

Related U.S. Application Data

(63) Continuation of application No. PCT/CN2021/083582, filed on Mar. 29, 2021.

(30) Foreign Application Priority Data

Mar. 31, 2020     (CN) .......................... 202010245639.1

(51) Int. Cl.
*G11B 27/34*          (2006.01)
*G06F 3/0481*         (2022.01)
(Continued)

(52) U.S. Cl.
CPC ............ *G11B 27/34* (2013.01); *G06F 3/0481* (2013.01); *G06F 16/735* (2019.01);
(Continued)

(58) Field of Classification Search
CPC ... G11B 27/34; G06F 16/743; G06F 16/7867; G06F 16/735; G06F 40/166;
(Continued)

(56) References Cited

U.S. PATENT DOCUMENTS

2004/0128691 A1     7/2004   Egawa et al.
2009/0204471 A1*    8/2009   Elenbaas ................ G06Q 10/06
                                                    726/28

(Continued)

FOREIGN PATENT DOCUMENTS

CN          106056359  A      10/2016
CN          107210001  A      9/2017
(Continued)

OTHER PUBLICATIONS

Wikipedia, https://en.wikipedia.org/w/index.php?title=Progress_bar &oldid=912283562, Progress bar definition, Jan. 8, 2023.
(Continued)

*Primary Examiner* — Sunghyoun Park
(74) *Attorney, Agent, or Firm* — Price Heneveld LLP

(57)          ABSTRACT

A scratchpad creation method and an electronic device are disclosed. The method includes: receiving a first input performed by a user on a target identifier, where the target identifier is associated with a first video file; and displaying a first scratchpad in response to the first input, where the first scratchpad is a scratchpad created based on content of the first video file, the first scratchpad includes at least one video identifier and at least one progress identifier, the video identifier is used to indicate a video clip in the first video file, and the progress identifier is used to indicate completion progress of an operation corresponding to the video clip.

16 Claims, 14 Drawing Sheets

(51) Int. Cl.

| | |
|---|---|
| *G06F 16/735* | (2019.01) |
| *G06F 16/74* | (2019.01) |
| *G06F 16/78* | (2019.01) |
| *G06F 40/166* | (2020.01) |
| *G06V 20/40* | (2022.01) |
| *H04N 5/76* | (2006.01) |
| *G06F 3/04817* | (2022.01) |
| *G09B 19/00* | (2006.01) |

(52) U.S. Cl.
CPC ........ *G06F 16/743* (2019.01); *G06F 16/7867* (2019.01); *G06F 40/166* (2020.01); *G06V 20/48* (2022.01); *G06V 20/49* (2022.01); *H04N 5/76* (2013.01); *G06F 3/04817* (2013.01); *G09B 19/003* (2013.01)

(58) Field of Classification Search
CPC ... G06F 3/0481; G06F 3/04817; G06V 20/49; G06V 20/48; H04N 5/76; G09B 19/003
See application file for complete search history.

(56) References Cited

U.S. PATENT DOCUMENTS

| | | | | |
|---|---|---|---|---|
| 2012/0170914 | A1* | 7/2012 | Brahms ................ | H04N 9/8227 386/E5.028 |
| 2013/0308209 | A1* | 11/2013 | Baba ................... | G02B 13/0015 359/780 |
| 2013/0330059 | A1 | 12/2013 | Matsumoto et al. | |
| 2014/0189515 | A1* | 7/2014 | Waldman ............. | G06F 16/444 715/719 |
| 2016/0247025 | A1* | 8/2016 | Huang ................ | G06V 40/168 |
| 2016/0322081 | A1 | 11/2016 | Schileru | |
| 2018/0025658 | A1 | 1/2018 | Takahashi et al. | |
| 2018/0047429 | A1 | 2/2018 | Smith | |
| 2019/0087060 | A1 | 3/2019 | Oh | |
| 2019/0267041 | A1* | 8/2019 | Ricciardi ......... | H04N 21/23418 |

FOREIGN PATENT DOCUMENTS

| | | |
|---|---|---|
| CN | 108347482 A | 7/2018 |
| CN | 108710521 A | 10/2018 |
| CN | 108737904 A | 11/2018 |
| CN | 109040838 A | 12/2018 |
| CN | 109669710 A | 4/2019 |
| CN | 110121083 A | 8/2019 |
| CN | 110868633 A | 3/2020 |
| CN | 110933509 A | 3/2020 |
| CN | 111400552 A | 7/2020 |
| JP | 2004207951 A | 7/2004 |
| JP | 2010283434 A | 12/2010 |
| JP | 2015004897 A | 1/2015 |
| JP | 2018125702 A | 8/2018 |
| WO | 2013099282 A1 | 7/2013 |

OTHER PUBLICATIONS

Stuart Taylor, Shahram Izadi, David Kirk, Richard Harper, Armando Garcia-Mendoza, Microsoft Research Cambridge, J J Thomson A venue, Cambridge, UK, Turning the Tables: An Interactive Surface for VJing, CHI 2009, Using Tabletops for Education, Science, and Media, Apr. 8, 2009, Boston, MA, USA.

* cited by examiner

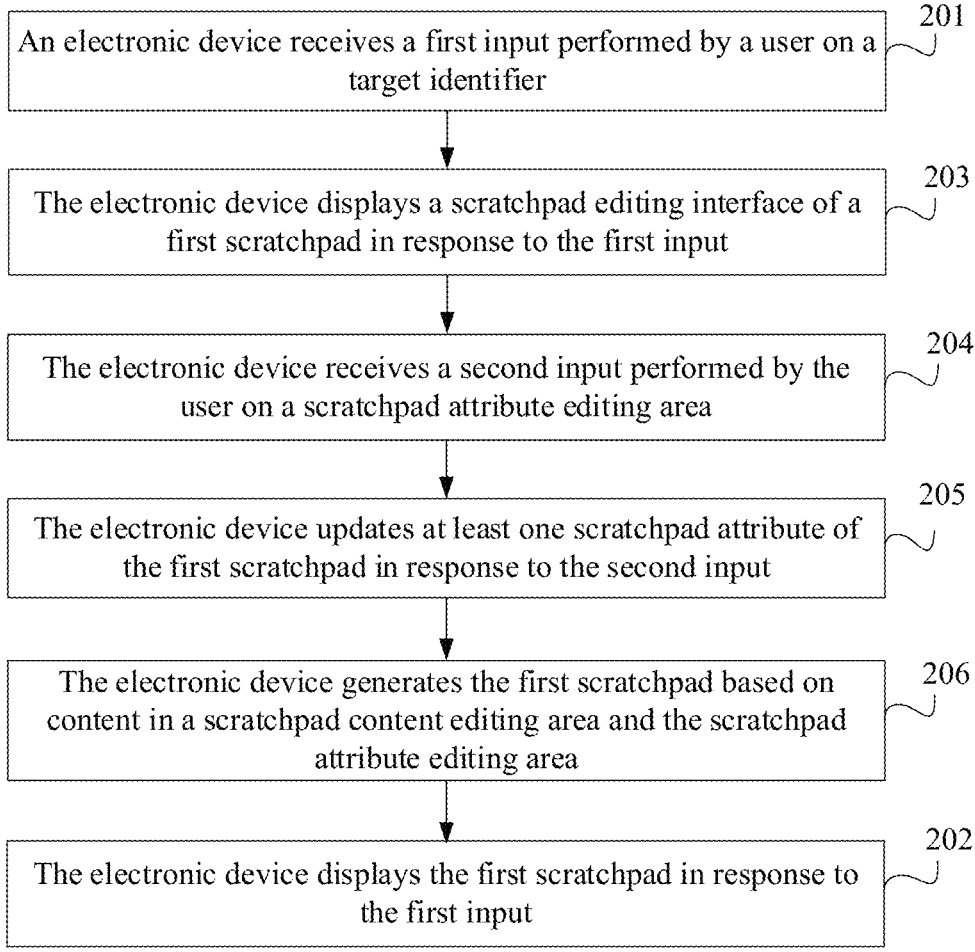

An electronic device receives a first input performed by a user on a target identifier ⟩ 201

The electronic device displays a scratchpad editing interface of a first scratchpad in response to the first input ⟩ 203

The electronic device receives a second input performed by the user on a scratchpad attribute editing area ⟩ 204

The electronic device updates at least one scratchpad attribute of the first scratchpad in response to the second input ⟩ 205

The electronic device generates the first scratchpad based on content in a scratchpad content editing area and the scratchpad attribute editing area ⟩ 206

The electronic device displays the first scratchpad in response to the first input ⟩ 202

FIG. 7

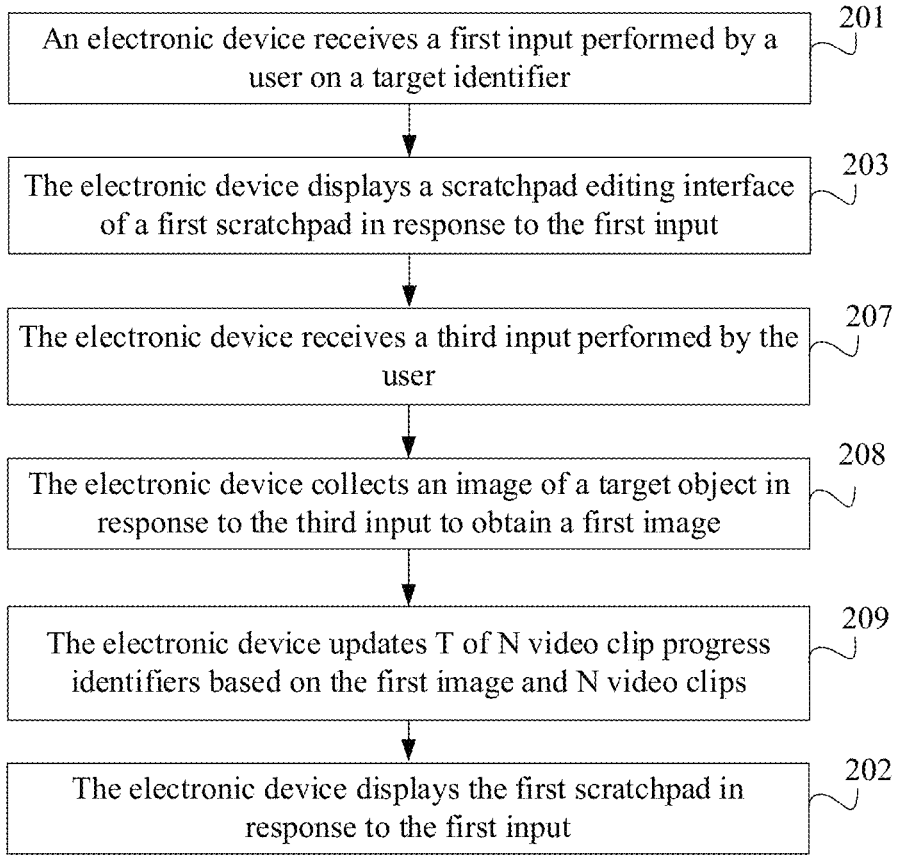

An electronic device receives a first input performed by a user on a target identifier                    201

The electronic device displays a scratchpad editing interface of a first scratchpad in response to the first input        203

The electronic device receives a third input performed by the user                    207

The electronic device collects an image of a target object in response to the third input to obtain a first image        208

The electronic device updates T of N video clip progress identifiers based on the first image and N video clips        209

The electronic device displays the first scratchpad in response to the first input                    202

FIG. 8

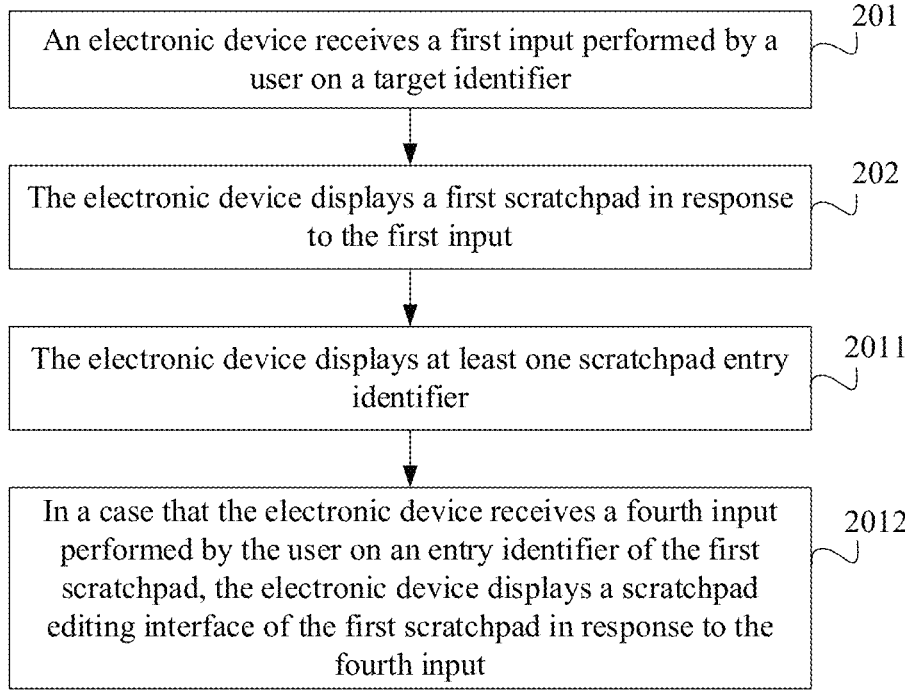

An electronic device receives a first input performed by a user on a target identifier ∼201

The electronic device displays a first scratchpad in response to the first input ∼202

The electronic device displays at least one scratchpad entry identifier ∼2011

In a case that the electronic device receives a fourth input performed by the user on an entry identifier of the first scratchpad, the electronic device displays a scratchpad editing interface of the first scratchpad in response to the fourth input ∼2012

FIG. 9

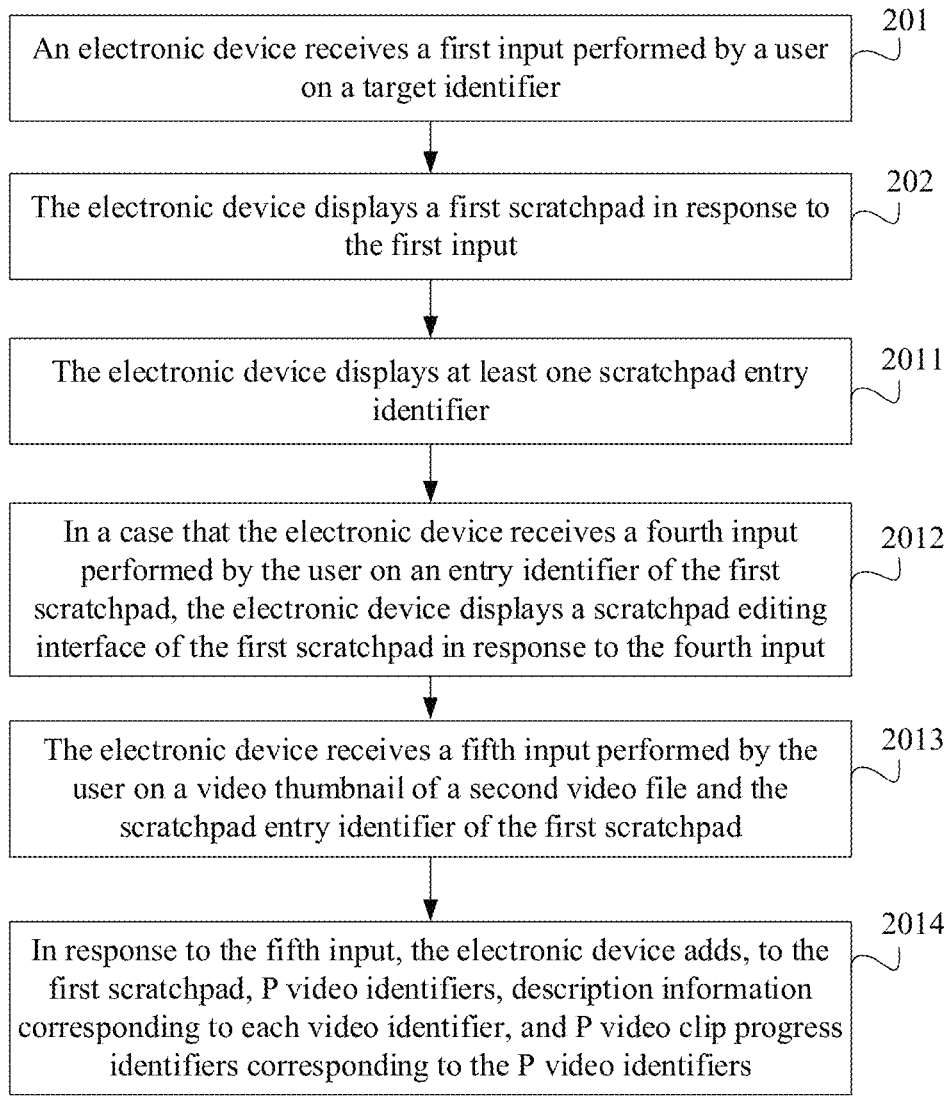

An electronic device receives a first input performed by a user on a target identifier — 201

The electronic device displays a first scratchpad in response to the first input — 202

The electronic device displays at least one scratchpad entry identifier — 2011

In a case that the electronic device receives a fourth input performed by the user on an entry identifier of the first scratchpad, the electronic device displays a scratchpad editing interface of the first scratchpad in response to the fourth input — 2012

The electronic device receives a fifth input performed by the user on a video thumbnail of a second video file and the scratchpad entry identifier of the first scratchpad — 2013

In response to the fifth input, the electronic device adds, to the first scratchpad, P video identifiers, description information corresponding to each video identifier, and P video clip progress identifiers corresponding to the P video identifiers — 2014

FIG. 11

SCRATCHPAD CREATION METHOD AND ELECTRONIC DEVICE

CROSS-REFERENCE TO RELATED APPLICATIONS

This application is a continuation application of International Application No. PCT/CN2021/083582 filed on Mar. 29, 2021, which claims priority to Chinese Patent Application No. 202010245639.1, filed in China on Mar. 31, 2020, which are incorporated herein by reference in their entireties.

TECHNICAL FIELD

Embodiments of the present invention relate to the field of communications technologies, and in particular, to a scratchpad creation method and an electronic device.

BACKGROUND

With continuous development of communications technologies, a user can watch a tutorial video (for example, a tutorial video for learning how to cook) by using an electronic device.

Generally, in a process of performing a manual operation by the user according to the tutorial video displayed on the electronic device, the user may trigger the electronic device to pause playing the tutorial video, and perform a manual operation according to a played video. After completing a corresponding tutorial step, the user may then trigger the electronic device to continue to play the tutorial video. In addition, if the user needs to watch a video corresponding to a specific tutorial step in the tutorial video, the user may tap a rewind control to trigger the electronic device to play the video corresponding to the tutorial step.

However, in the foregoing process, because duration of the tutorial video is long and tutorial steps in the tutorial video are tedious, the user may repeatedly trigger the electronic device to pause playing the tutorial video. In addition, when the user needs to watch a video corresponding to a specific tutorial step, the user needs to search for the video in the tutorial video. As a result, the process of completing an operation by the user according to the tutorial video is inflexible and tedious.

SUMMARY

Embodiments of the present invention provide a scratchpad creation method and an electronic device, to resolve a problem that a process of completing an operation by a user according to a tutorial video is inflexible and tedious.

To resolve the foregoing technical problem, the present invention is implemented as follows.

According to a first aspect, an embodiment of the present invention provides a scratchpad creation method. The method is applied to an electronic device, and the method includes: receiving a first input performed by a user on a target identifier, and displaying a first scratchpad in response to the first input, where the target identifier is associated with a first video file, the first scratchpad is a scratchpad created based on content of the first video file, the first scratchpad includes at least one video identifier and at least one video clip progress identifier, the video identifier is used to indicate a video clip in the first video file, and the video clip progress identifier is used to indicate completion progress of an operation corresponding to the video clip.

According to a second aspect, an embodiment of the present invention provides an electronic device. The electronic device may include a receiving module and a processing module. The receiving module is configured to receive a first input performed by a user on a target identifier, where the target identifier is associated with a first video file. The processing module is configured to display a first scratchpad in response to the first input received by the receiving module, where the first scratchpad is a scratchpad created based on content of the first video file, the first scratchpad includes at least one video identifier and at least one video clip progress identifier, the video identifier is used to indicate a video clip in the first video file, and the video clip progress identifier is used to indicate completion progress of an operation corresponding to the video clip.

According to a third aspect, an embodiment of the present invention provides an electronic device. The electronic device includes a processor, a memory, and a computer program stored in the memory and capable of running on the processor, where when the computer program is executed by the processor, the steps of the scratchpad creation method according to the first aspect are implemented.

According to a fourth aspect, an embodiment of the present invention provides a computer-readable storage medium, where the computer-readable storage medium stores a computer program, and when the computer program is executed by a processor, the steps of the scratchpad creation method according to the first aspect are implemented.

In the embodiments of the present invention, the electronic device may receive the first input performed by the user on the target identifier (associated with the first video file), and display the first scratchpad in response to the first input, where the first scratchpad is a scratchpad created based on content of the first video file, the first scratchpad includes at least one video identifier and at least one video clip progress identifier, the video identifier is used to indicate a video clip in the first video file, and the video clip progress identifier is used to indicate completion progress of an operation corresponding to the video clip. In this solution, after the user performs an input on an identifier associated with a video file (for example, a thumbnail of the video file or a video recording control), the electronic device may be triggered to automatically generate a scratchpad based on content of the video file, and the scratchpad includes at least one video identifier and at least one video clip progress identifier. In this case, when the user needs to watch a specific video clip in the video file, the user may tap a video identifier corresponding to the video clip to find the video clip required by the user, and the user does not need to repeatedly trigger the electronic device to pause playing or rewind the video file, so that the user can flexibly and quickly complete an operation according to the video file.

BRIEF DESCRIPTION OF DRAWINGS

FIG. 7 is a third schematic diagram of a scratchpad creation method according to an embodiment of the present invention;

FIG. 8 is a fourth schematic diagram of a scratchpad creation method according to an embodiment of the present invention;

FIG. 9 is a fifth schematic diagram of a scratchpad creation method according to an embodiment of the present invention;

FIG. 11 is a sixth schematic diagram of a scratchpad creation method according to an embodiment of the present invention;

DESCRIPTION OF EMBODIMENTS

Figure 1:
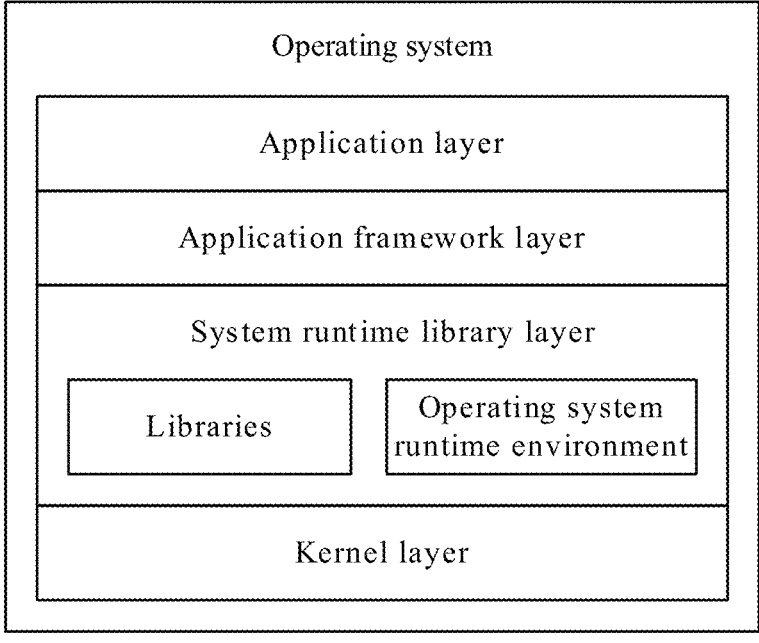
FIG. 1 is a schematic architectural diagram of an operating system according to an embodiment of the present invention.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of this application.

The term "and/or" in the specification describes an association relationship for describing associated objects and represents that three relationships may exist. For example, A and/or B may represent the following three cases: Only A exists, both A and B exist, and only B exists. The symbol "/" in the specification indicates an "or" relationship of associated objects. For example, A/B means A or B.

The terms "first", "second", and so on in the specification are intended to distinguish between different objects but do not indicate a particular order of the objects. For example, a first input, a second input, and so on are used to distinguish between different inputs, rather than describe a specific sequence of inputs.

In the embodiments of the present invention, the word such as "an example" or "for example" is used to represent giving an example, an instance, or an illustration. Any embodiment or design solution described as "an example" or "for example" in the embodiments of the present invention shall not be interpreted to be more preferential or advantageous than other embodiments or design solutions. Specifically, the terms such as "an example" or "for example" are used to present related concepts in a specific manner.

In the descriptions of the embodiments of the present invention, "plurality" means at least two, unless otherwise specified. For example, a plurality of components means at least two components.

Currently, an electronic device may include a plurality of scratchpad-taking application programs (a built-in application program of the electronic device and/or an application program installed upon triggering by a user), for example, a notepad application program, a scratchpad application program, a memo application program, and any other possible forms of scratchpad-taking application programs. Usually, a user may manually record content related to a specific file (for example, a video file, a picture file, or an audio recording file) by using a scratchpad application program. However, in this manner, association between the recorded content and the file may be poor. To resolve this problem, the embodiments of the present invention provide a scratchpad creation method and an electronic device. The electronic device may receive a first input performed by a user on a target identifier (associated with a first video file), and display a first scratchpad in response to the first input, where the first scratchpad is a scratchpad created based on content of the first video file, the first scratchpad includes at least one video identifier and at least one video clip progress identifier, the video identifier is used to indicate a video clip in the first video file, and the video clip progress identifier is used to indicate completion progress of an operation corresponding to the video clip. In this solution, after the user performs an input on an identifier associated with a video file (for example, a thumbnail of the video file or a video recording control), the electronic device may be triggered to automatically generate a scratchpad based on content of the video file, and the scratchpad includes at least one video identifier and at least one video clip progress identifier. In this case, when the user needs to watch a specific video clip in the video file, the user may tap a video identifier corresponding to the video clip to find the video clip required by the user, and the user does not need to repeatedly trigger the electronic device to pause playing the video file, so that the user can flexibly and quickly complete an operation according to the video file.

The electronic device in the embodiments of the present invention may be an electronic device with an operating system. The operating system may be an Android operating system, may be an iOS operating system, or may be another possible operating system. This is not specifically limited in the embodiments of the present invention.

The following uses an operating system as an example to describe a software environment to which the scratchpad creation method provided in the embodiments of the present invention is applied.

FIG. 1 is a schematic architectural diagram of a possible operating system according to an embodiment of the present invention. In FIG. 1, an architecture of the operating system includes four layers: an application program layer, an application program framework layer, a system runtime library layer, and a kernel layer (which may be specifically a Linux kernel layer).

The application program layer includes various application programs (including system application programs and third-party application programs) in the operating system, For example, the application program layer may include an application program for displaying a scratchpad editing interface and a scratchpad setting interface in the embodiments of the present invention. For example, the application program may be a camera application program, a scratchpad application program, or any application program that may display a scratchpad editing interface and a scratchpad setting interface.

The application program framework layer is a framework of application programs, and developers may develop some application programs based on the application program framework layer in compliance with development principles of the framework of application programs. For example, an application program for displaying the scratchpad editing interface in the embodiments of the present invention may be developed based on the application program framework layer.

Generally, the application program for displaying the scratchpad editing interface in the embodiments of the present invention may include two parts. One part is a service running in the background of an electronic device, and is used to detect an input performed by a user on the scratchpad editing interface displayed by the application program, display a scratchpad based on the input, and the like. The other part is content displayed on a screen of the electronic device, for example, a scratchpad entry identifier displayed on the screen of the electronic device.

The system runtime library layer includes a library (also referred to as a system library) and an operating system runtime environment. The library mainly provides various resources required by the operating system. The operating system runtime environment is used to provide a software environment for the operating system.

The kernel layer is an operating system layer of the operating system, and is a bottom layer in software layers of the operating system. The kernel layer provides core system services and hardware-related drivers for the operating system based on a Linux kernel.

Using the operating system as an example, in the embodiments of the present invention, developers may develop, based on the system architecture of the operating system shown in FIG. 1, a software program for implementing the scratchpad creation method provided in the embodiments of the present invention, so that the scratchpad creation method can be performed based on the operating system shown in FIG. 1. In other words, a processor or an electronic device may implement the scratchpad creation method provided in the embodiments of the present invention by running the software program in the operating system.

The electronic device in the embodiments of the present invention may be a mobile electronic device or a non-mobile electronic device. For example, the mobile electronic device may be a mobile phone, a tablet computer, a notebook computer, a palmtop computer, a vehicle-mounted terminal, a wearable device, an ultra-mobile personal computer (UMPC), a netbook, or a personal digital assistant (PDA), and the non-mobile electronic device may be a personal computer (PC), a television (TV), a teller machine, a self-service machine, or the like. This is not specifically limited in the embodiments of the present invention.

The scratchpad creation method provided in the embodiments of the present invention may be performed by the electronic device or by a functional module and/or a functional entity in the electronic device that are/is capable of implementing the scratchpad creation method. This may be specifically determined according to an actual use requirement, and is not limited in the embodiments of the present invention. The following describes the scratchpad creation method provided in the embodiments of the present invention by using an electronic device as an example.

In the embodiments of the present invention, in a process in which a user watches a video file (for example, a tutorial video file) or performs a manual operation according to the video file, because duration of the video file is long and steps in the video file are tedious, the user may be unable to accurately obtain content corresponding to each part of the video file. Therefore, the user may perform an input on an identifier associated with the video file (for example, a thumbnail of the video file or a video recording control), to trigger the electronic device to automatically generate a scratchpad based on content of the video file, and the scratchpad includes at least one video identifier and at least one video clip progress identifier. In this case, when the user needs to watch a specific video clip in the video file, the user may tap a video identifier corresponding to the video clip to find the video clip required by the user, and the user does not need to repeatedly trigger the electronic device to pause playing the video file, so that the user can flexibly and quickly complete an operation according to the video file.

The following specifically describes the scratchpad creation method provided in the embodiments of the present invention with reference to the accompanying drawings.

Figure 2:
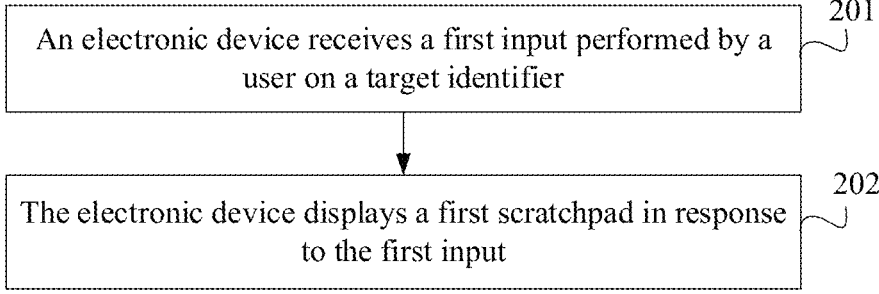
FIG. 2 is a first schematic diagram of a scratchpad creation method according to an embodiment of the present invention.

As shown in FIG. 2, an embodiment of the present invention provides a scratchpad creation method. The method may include the following step 201 and step 202.

Step 201: An electronic device receives a first input performed by a user on a target identifier.

The target identifier may be associated with a first video file.

In this embodiment of the present invention, that the target identifier is associated with the first video file may be understood as that an input performed by the user on the target identifier may trigger the electronic device to perform a related operation on the first video file. For example, an input performed by the user on the target identifier may trigger the electronic device to record the first video file, or an input performed by the user on the target identifier may trigger the electronic device to display the first video file.

Optionally, in this embodiment of the present invention, the target identifier may be an identifier displayed on a video recording interface of a camera application program.

Optionally, in this embodiment of the present invention, step 201 may be specifically implemented by the following step 201a.

Step 201a: The electronic device receives the first input performed by the user on the target identifier displayed on a video recording interface of the first video file.

In this embodiment of the present invention, the video recording interface of the first video file may be understood as an interface for recording the first video file or an interface for displaying a video thumbnail of the first video file.

Optionally, in this embodiment of the present invention, the target identifier may be the video thumbnail of the first video file, or may be a video recording control (for example, a video recording control for recording the first video file). It can be understood that, in a case that the target identifier is the video thumbnail of the first video file, the first input may be an input performed by the user on the video thumbnail of the first video file; or in a case that the target identifier is the video recording control, the first input may be an input performed by the user on the video recording control.

Figure 3:
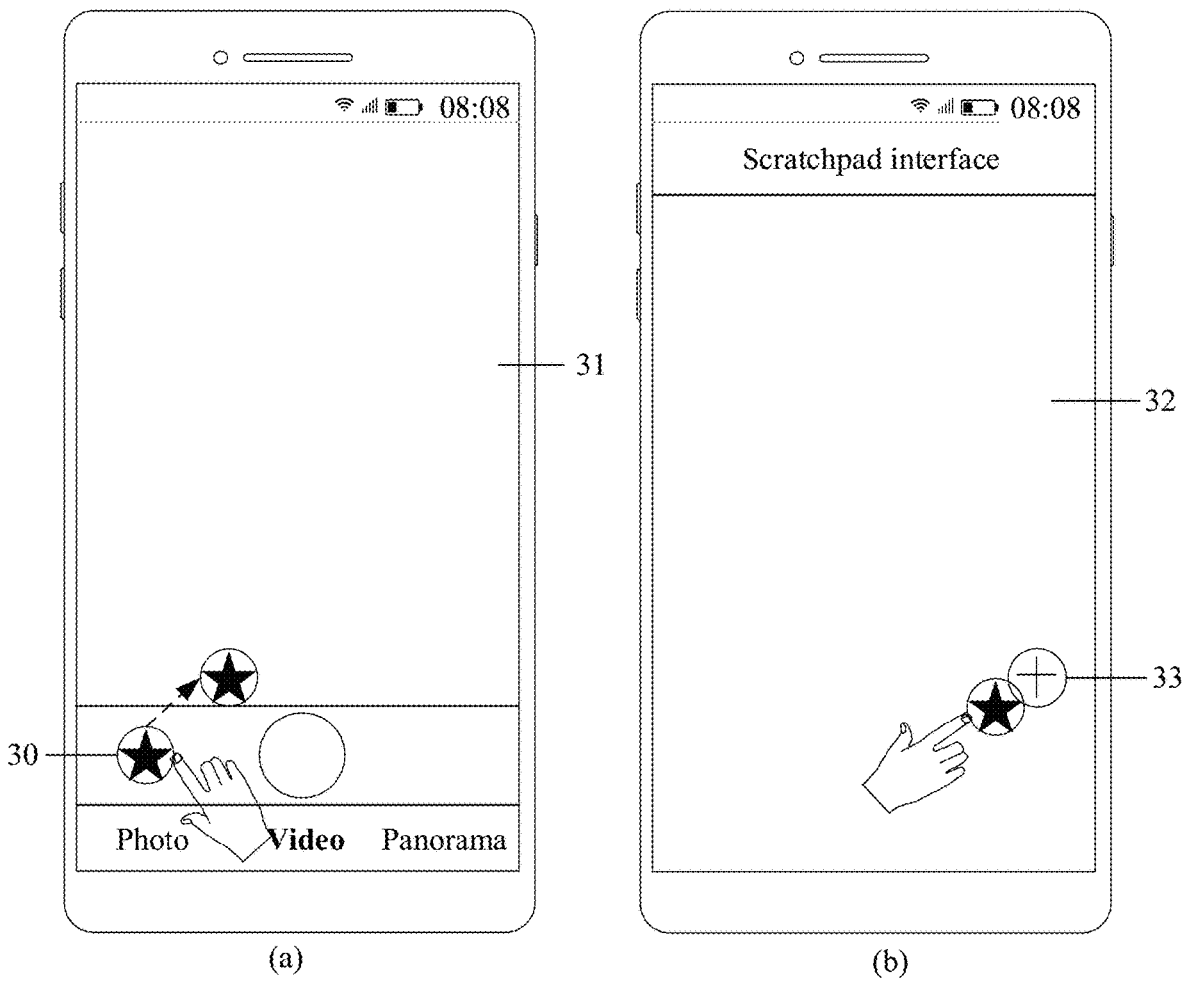
FIG. 3 is a first schematic diagram of an interface to which a scratchpad creation method according to an embodiment of the present invention is applied.

In this embodiment of the present invention, the video thumbnail may be an icon that is displayed on the video recording interface of the camera application program of the electronic device and that is used to indicate a video file (for example, the first video file). For example, (a) in FIG. 3 is a schematic diagram of a video recording interface of the camera application program displayed by the electronic device, and the video thumbnail may be an icon indicated by 30. The icon indicated by 30 may indicate a video file.

It should be noted that, in this embodiment of the present invention, after the user triggers the electronic device to record a video file, the video recording interface of the camera application program of the electronic device may display a video thumbnail of the video file. Alternatively, in a case that the user triggers the electronic device to display the video recording interface of the camera application program, the video recording interface of the camera application program of the electronic device may alternatively display a video thumbnail of a video file stored on the electronic device (for example, a video file that the user triggered the electronic device to record most recently, or a video file that the user triggered the electronic device to download most recently).

Optionally, in this embodiment of the present invention, in an implementation, in a case that the target identifier is the video thumbnail of the first video file, the first input may be specifically an input of the user tapping and holding and dragging the video thumbnail of the first video file to a video preview screen, or may be an input of the user tapping and holding and sliding the video thumbnail of the first video file to a video preview screen, or may be an input of the user double-tapping the video thumbnail of the first video file; or the like. Specifically, this may be determined based on an actual use requirement, and is not limited in this embodiment of the present invention.

The following describes a specific execution process of the first input by using an example in which the first input is the input of the user tapping and holding and dragging the video thumbnail of the first video file to the video preview screen.

In this embodiment of the present invention, the user may tap and hold and drag the video thumbnail of the first video file to the video preview screen, to trigger the electronic device to update the video recording interface to display a scratchpad interface, where the scratchpad interface includes a scratchpad adding control. Then the user may further drag the video thumbnail of the first video file to the scratchpad adding control. In this way, the input of the user dragging the video thumbnail of the first video file to the video preview screen, that is, an operation process of the first input, is completed.

It should be noted that, in this embodiment of the present invention, the scratchpad adding control may be used to add a new scratchpad.

Optionally, in this embodiment of the present invention, the scratchpad interface may be an interface of a scratchpad application program.

With reference to FIG. 3, the following further describes a specific operation process of the first input by using an example in which the first input is the input of the user tapping and holding and dragging the video thumbnail of the first video file to the video preview screen.

For example, it is assumed that the video thumbnail of the first video file is an icon 30. As shown in (a) in FIG. 3, when the user drags the icon 30 onto a video preview screen 31, as shown in (b) in FIG. 3, the electronic device may update the video recording interface to display a scratchpad interface 32, where the scratchpad interface 32 may include a scratchpad adding control 33. Then the user continues to drag the icon 30 onto the scratchpad adding control 33. In this way, the input of the user dragging the video thumbnail of the first video file to the video preview screen, that is, an operation process of the first input, is completed.

Optionally, in this embodiment of the present invention, the scratchpad interface may further include an entry identifier of at least one scratchpad.

It should be noted that, for descriptions that the scratchpad interface includes an entry identifier of at least one scratchpad, reference may be made to the following embodiments. To avoid repetition, details are not described herein.

In another implementation, in a case that the target identifier is the video recording control, the first input may be specifically an input of the user tapping and holding and dragging the video recording control to a video preview screen, or may be an input of the user tapping and holding and sliding the video recording control to a video preview screen, or may be an input of the user double-tapping the video recording control; or the like. Specifically, this may be determined based on an actual use requirement, and is not limited in this embodiment of the present invention.

It should be noted that, in this embodiment of the present invention, before the user performs the first input, the user may perform an input on the video recording control to trigger the electronic device to start recording the first video file.

The following describes a specific execution process of the first input by using an example in which the first input is the input of the user tapping and holding and dragging the video recording control to the video preview screen.

In this embodiment of the present invention, after the user triggers the electronic device to start recording the first video file, the user may tap and hold the video recording control to trigger the electronic device to display an icon of the video recording control superimposed on the video recording control. Then the user may drag the icon of the video recording control to the video preview screen, to trigger the electronic device to update the video recording interface to display a scratchpad interface, where the scratchpad interface includes a scratchpad adding control. Then the user may further drag the icon of the video recording control to the scratchpad adding control. In this way, the input of the user dragging the video recording control to the video preview screen, that is, an operation process of the first input, is completed.

It should be noted that, in this embodiment of the present invention, after the user taps and holds the video recording control, the electronic device may stop recording the first video.

Figure 4:
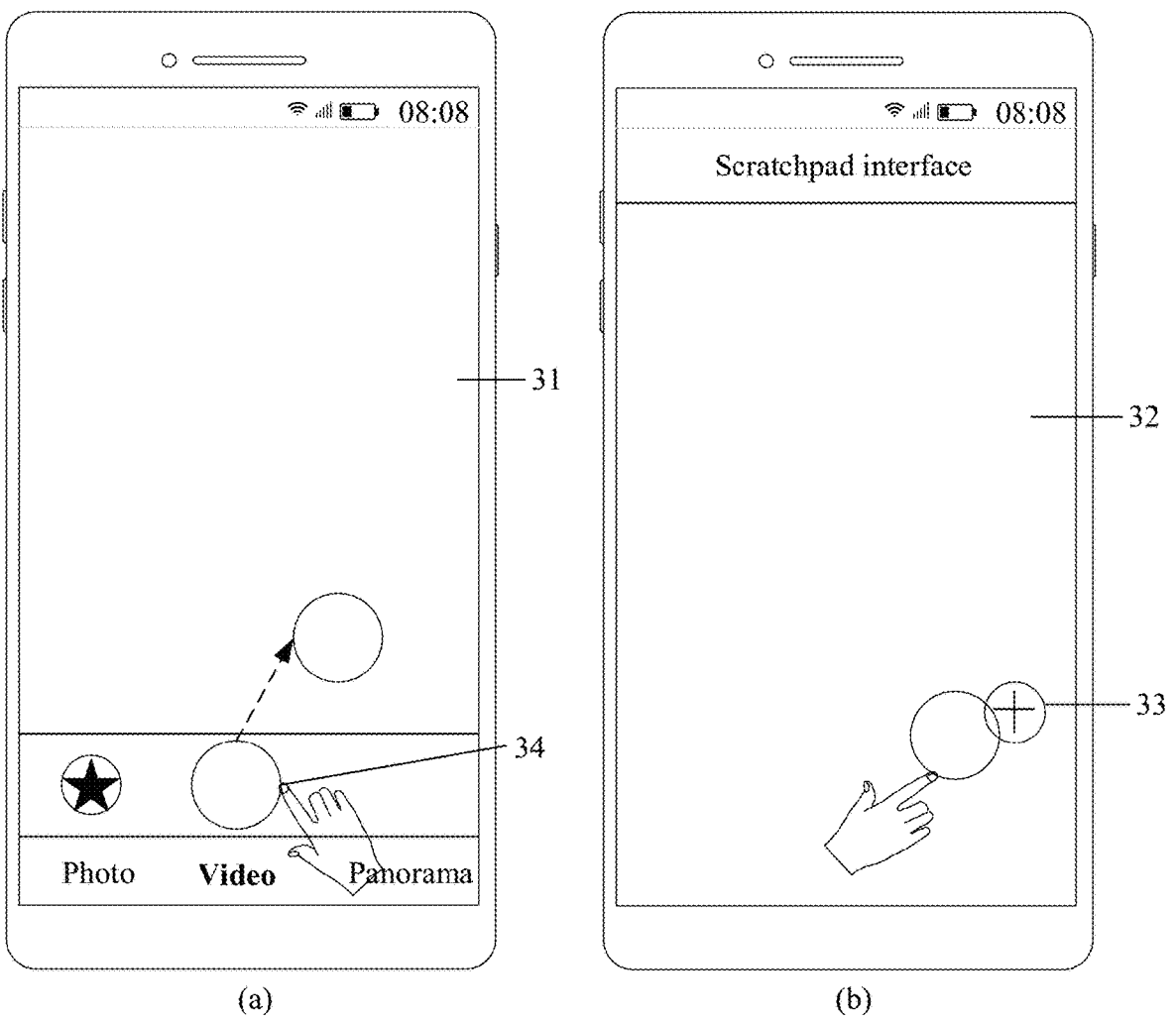
FIG. 4 is a second schematic diagram of an interface to which a scratchpad creation method according to an embodiment of the present invention is applied.

With reference to FIG. 4, the following further describes a specific operation process of the first input by using an example in which the first input is the input of the user tapping and holding and dragging the video recording control to the video preview screen.

For example, as shown in (a) in FIG. 4, after the user taps a video recording control 34 to trigger the electronic device to start recording the first video file, the user may tap and hold the video recording control 34 to trigger the electronic device to display an icon of the video recording control superimposed on the video recording control. Then the user may drag the icon of the video recording control to a video preview screen 31, as shown in (b) in FIG. 4, and the electronic device may update the video recording interface to display a scratchpad interface 32, where the scratchpad interface 32 may include a scratchpad adding control 33. Then the user continues to drag the icon of the video recording control to the scratchpad adding control 33. In this way, the input of the user tapping and holding and dragging the video recording control to the video preview screen, that is, an operation process of the first input, is completed.

In this embodiment of the present invention, the user may perform an input on the target identifier on the video recording interface to trigger the electronic device to switch to the scratchpad interface, so that the user can quickly enter the scratchpad interface.

Step 202: The electronic device displays a first scratchpad in response to the first input.

The first scratchpad may be a scratchpad created based on content of the first video file, and the first scratchpad includes at least one video identifier and at least one video clip progress identifier. The video identifier may be used to indicate a video clip in the first video file. The video clip progress identifier may be used to indicate completion progress of an operation corresponding to the video clip.

For descriptions about the video identifier, the video clip progress identifier, and the video clip, reference may be made to related descriptions in the following embodiments. Details are not described herein.

Optionally, in this embodiment of the present invention, step 202 may be specifically implemented by the following step 202*a*.

Step 202*a*: The electronic device displays the first scratchpad in response to the first input in a case that an input characteristic of the first input is a preset input characteristic.

The preset input characteristic may be dragging, by the user, the target identifier to the scratchpad adding control.

In this embodiment of the present invention, after the electronic device receives the first input performed by the user, the electronic device may create, based on the content of the first video file, the first scratchpad associated with the first video file, and display the first scratchpad.

The scratchpad creation method provided in this embodiment of the present invention is applied to a scenario in which the user needs to watch a video corresponding to a tutorial step and does not need to pause or rewind the video. After the user performs an input on an identifier associated with a video file (for example, a thumbnail of the video file or a video recording control), the electronic device may be triggered to automatically generate a scratchpad based on content of the video file, and the scratchpad includes at least one video identifier and at least one video clip progress identifier. In this case, when the user needs to watch a specific video clip in the video file, the user may tap a video identifier corresponding to the video clip to find the video clip required by the user, and the user does not need to repeatedly trigger the electronic device to pause playing or rewind the video file, so that the user can flexibly and quickly complete an operation according to the video file.

Optionally, in this embodiment of the present invention, after the user performs the first input on the electronic device, the electronic device may first display a scratchpad editing interface, so that the user can confirm or modify scratchpad information; and after the user confirms or modifies the scratchpad information, the electronic device may display the first scratchpad.

Figure 5:
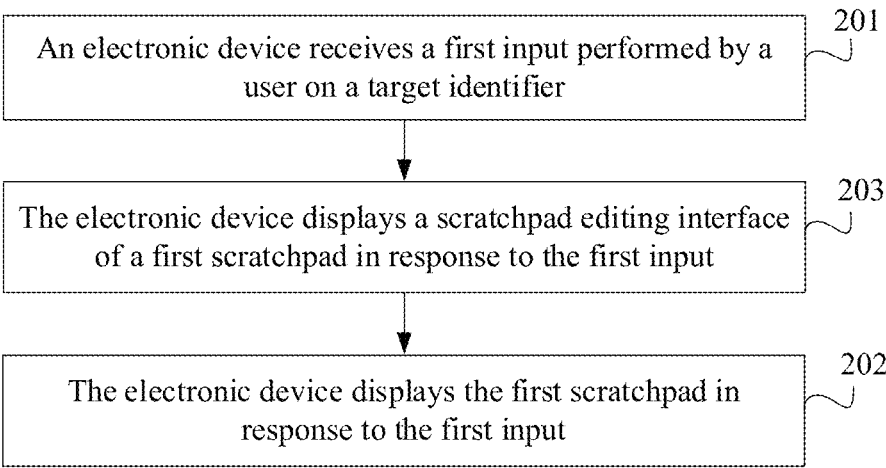
FIG. 5 is a second schematic diagram of a scratchpad creation method according to an embodiment of the present invention.

For example, with reference to FIG. 2, as shown in FIG. 5, after step 201 and before step 202, the scratchpad creation method provided in this embodiment of the present invention may further include the following step 203.

Step 203: The electronic device displays a scratchpad editing interface of the first scratchpad in response to the first input.

The scratchpad editing interface may include a scratchpad content editing area. The scratchpad content editing area may include N video identifiers, description information corresponding to each video identifier, and N video clip progress identifiers corresponding to the N video identifiers, where N is a positive integer.

Optionally, in this embodiment of the present invention, each of the N video identifiers may correspond to one of N video clips, and the N video clips may be video clips obtained by the electronic device dividing the first video file based on the content of the first video file.

Optionally, in this embodiment of the present invention, step 203 may be specifically implemented by the following step 203*a* to step 203*c*.

Step 203*a*: The electronic device recognizes the content of the first video file in response to the first input, to obtain N groups of video operation information.

Optionally, in this embodiment of the present invention, each of the N groups of video operation information may include at least one of the following: text information, voice information, and gesture information.

It should be noted that, in this embodiment of the present invention, an order of the N groups of video operation information may be determined based on a chronological order of video operation steps in the first video file.

For example, the voice information is used as an example. It is assumed that the first video file includes voice content: "First, choose color of paper. Next, fold the paper. Finally, cut the paper." In this case, the electronic device may obtain operation information like "first", "next", and "finally".

Optionally, in this embodiment of the present invention, the electronic device may recognize the content of the first video file by using an AI technology, to obtain the N groups of video operation information, and the arrangement order of the N groups of video operation information may be determined based on the sequential order of the video operation steps in the first video file.

Optionally, in this embodiment of the present invention, each of the N groups of video operation information may correspond to related or similar operation steps in the first video file. For example, it is assumed that the content of the first video file is making a paper airplane, the electronic device may recognize the content of the first video file by using the AI technology, to obtain three groups of content information. The first group of video operation information may correspond to content related to or similar to choosing color of paper in the first video file. The second group of video operation information may correspond to content related to or similar to cutting the paper in the first video file. The third group of video operation information may correspond to content related to or similar to making a paper airplane in the first video file.

Step 203*b*: The electronic device splits the first video file into N video clips based on the N groups of video operation information.

Each of the N video clips may correspond to one of the N groups of video operation information, in other words, different video clips correspond to different groups of video operation information. It can be understood that operation steps in each video clip are related or similar.

For example, with reference to the example in step 203*a*, after the electronic device obtains the operation information like "first", "then", and "finally", the electronic device may split the first video file into three video clips. The first video clip is video content corresponding to a segment from the voice "first" to the voice "then" in the first video file. The second video clip is video content corresponding to a segment from the voice "then" to the voice "finally" in the first video file content. The third video clip is video content corresponding to a segment from the voice "finally" in the first video file to an end of the first video file.

Step 203c: The electronic device displays the scratchpad editing interface of the first scratchpad based on the N video clips.

In this embodiment of the present invention, after the electronic device obtains the N groups of video operation information, the electronic device may split the first video file into the N video clips based on the N groups of video operation information, and then the electronic device may display the scratchpad editing interface of the first scratchpad based on the N video clips. Specifically, the electronic device may display entry identifiers of the N video clips (namely, N video identifiers) based on the N video clips; and display, based on content of the N video clips, description information corresponding to each video identifier, and display N video clip progress identifiers corresponding to the N video identifiers.

Figure 6:
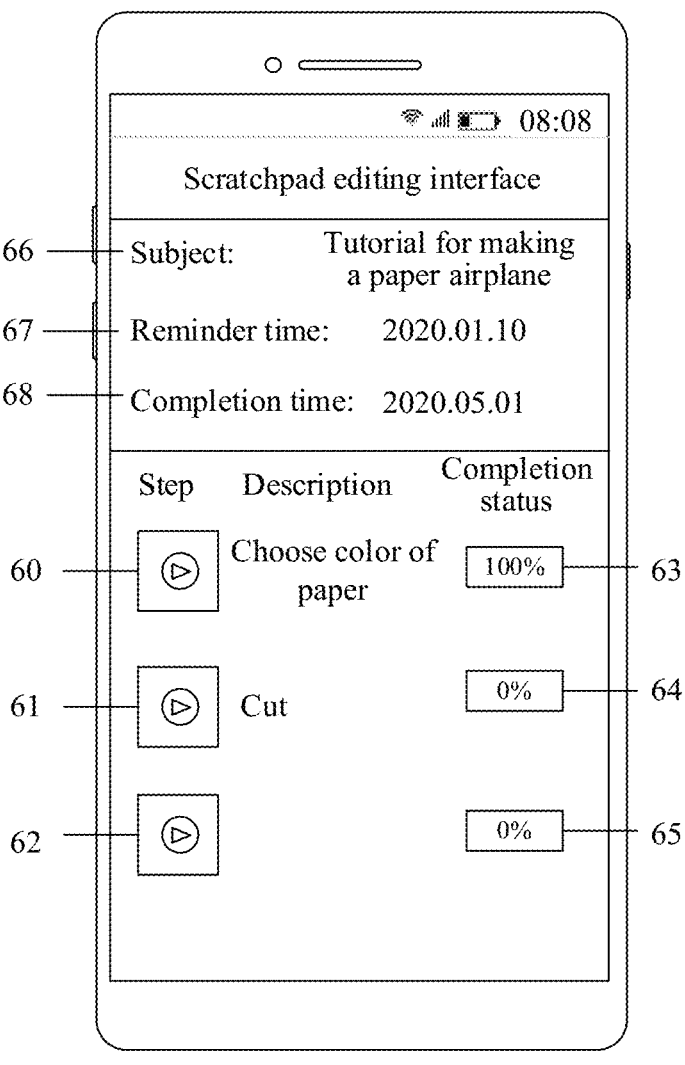
FIG. 6 is a third schematic diagram of an interface to which a scratchpad creation method according to an embodiment of the present invention is applied.

In this embodiment of the present invention, each of the N video identifiers may be an entry identifier of one of the N video clips. To be specific, the user may tap an entry identifier of a video clip to trigger the electronic device to play back the video clip. A form of the video identifier may be a thumbnail of a video clip, that is, a display form of the video identifier herein may be the same as the display form of the foregoing video thumbnail. For example, it is assumed that the content of the first video file is making a paper airplane, and the electronic device splits the first video file into three video clips. As shown in FIG. 6, the scratchpad editing interface may include a video identifier 60 (indicating the first video clip), a video identifier 61 (indicating the second video clip), and a video identifier 62 (indicating the third video clip).

In this embodiment of the present invention, the description information corresponding to each video identifier may be used to describe content of a video clip corresponding to the video identifier.

It should be noted that, in this embodiment of the present invention, the description information corresponding to each video identifier may be automatically determined by the electronic device based on content of a video clip indicated by the video identifier. Certainly, it can be understood that, if the electronic device cannot determine content of a video clip indicated by a video identifier, the electronic device may not display description information corresponding to the video identifier.

For example, it is assumed that, the electronic device determines that content of the first video clip is "choose color of paper" and content of the second video clip is "cut the paper", and the electronic device cannot determine content of the third video clip. As shown in FIG. 6, the video identifier 60 may correspond to description information "color of paper", the video identifier 61 may correspond to description information "cut", and the video identifier 62 has no corresponding description information.

Optionally, in this embodiment of the present invention, the user may modify or add, according to an actual requirement, description information corresponding to each video identifier.

In this embodiment of the present invention, the video clip progress identifier corresponding to each video identifier may be used to indicate completion progress of a user operation related to a video clip corresponding to the video identifier. In other words, a video clip progress identifier corresponding to a video identifier may indicate progress of performing, by the user, an operation related to a video clip, where the video identifier corresponds to the video clip.

It should be noted that, in this embodiment of the present invention, in a case that the user does not perform an operation related to a video clip, a status indicated by a video clip progress identifier that corresponds to a video identifier corresponding to the video clip is 0%.

For example, after the user completes an operation of choosing color of paper, that is, after the user completes an operation related to the first video clip, as shown in FIG. 6, a progress status indicated by a video clip progress identifier 63 that corresponds to the video identifier 60 corresponding to the first video clip is 100%, a progress status indicated by a video clip progress identifier 64 that corresponds to the video identifier 61 corresponding to the second video clip is 0%, and a progress status indicated by a video clip progress identifier 65 that corresponds to the video identifier 62 corresponding to the third video clip is 0%.

The scratchpad creation method provided in this embodiment of the present invention may be applied to a scenario in which the user needs to watch a video corresponding to a tutorial step and does not need to pause or rewind the video. Because the user can view a division status of the first video file on the scratchpad editing interface and set content of the first scratchpad according to a requirement of the user, the scratchpad can be set more flexibly, so that scratchpad content can better adapt to an actual use requirement of the user.

Further, because the electronic device can split the first video file into the N video clips based on the content of the first video file, when the user needs to watch a video clip in the first video file, the user can accurately and quickly find the video clip among the N video clips, thereby avoiding an operation of triggering, by the user a plurality of times, the electronic device to pause playing or rewind the first video file to look for the video clip.

Furthermore, because the electronic device can recognize the content of the first video file based on the AI technology and the AI technology can obtain information about use habits of Internet users, the N video clips obtained through division by the electronic device adapt to requirements of different users.

Optionally, in this embodiment of the present invention, the scratchpad editing interface may further include a scratchpad attribute editing area, and the scratchpad attribute editing area may include at least one scratchpad attribute of the first scratchpad.

For example, with reference to FIG. 5, as shown in FIG. 7, in a case that the scratchpad editing interface includes a scratchpad attribute editing area and the scratchpad attribute editing area includes at least one scratchpad attribute of the first scratchpad, after step 203, the scratchpad creation method provided in this embodiment of the present invention may further include the following step 204 to step 206.

Step 204: The electronic device receives a second input performed by the user on the scratchpad attribute editing area.

Optionally, in this embodiment of the present invention, the scratchpad attribute editing area may include a scratchpad subject of the first scratchpad, a scratchpad reminder time of the first scratchpad, and a scratchpad completion time of the first scratchpad.

The scratchpad subject may be used for the user to set a subject (or referred to as a name) of a scratchpad, namely, the entry identifier of the first scratchpad described below. Both the scratchpad reminder time and the scratchpad completion time may be used to remind the user, where the scratchpad reminder time may be used to remind the user to perform an operation related to the first video file at a specific time, and the scratchpad completion time may be used to remind the user to complete an operation related to the first video file at a specific time.

In this embodiment of the present invention, the scratchpad subject of the first scratchpad, the scratchpad reminder time of the first scratchpad, or the scratchpad completion time of the first scratchpad are referred to as scratchpad attributes of the first scratchpad.

Optionally, in this embodiment of the present invention, the second input may be an editing input performed by the user on the scratchpad attribute editing area.

Step 205: The electronic device updates at least one scratchpad attribute of the first scratchpad in response to the second input.

In this embodiment of the present invention, after the electronic device receives the second input performed by the user, the electronic device may update the at least one scratchpad attribute of the first scratchpad in response to the second input.

For example, it is assumed that the content of the first video file is making a paper airplane. In a case that the user needs to perform an operation of making a paper airplane according to operation steps of making a paper airplane in the first video file, FIG. 6 is a schematic diagram of a scratchpad editing interface displayed by the electronic device. The scratchpad editing interface includes a scratchpad subject 66, a scratchpad reminder time 67, and a scratchpad completion time 68. If the user needs to set the scratchpad subject to "tutorial for making a paper airplane", the user may perform the second input, to be specific, input "tutorial for making a paper airplane" in the scratchpad subject 66, so that the electronic device can update the scratchpad subject of the first scratchpad to "tutorial for making a paper airplane". If the user needs to perform an operation of making a paper airplane on Jan. 10, 2020, the user may perform the second input, to be specific, input 2020.01.10 in the scratchpad reminder time 67, so that the electronic device can update the scratchpad reminder time of the first scratchpad to "2020.01.10", and, the electronic device can remind the user to learn how to make a paper airplane according to the first video on Jan. 10, 2020. If the user needs to complete the operation of making a paper airplane before May 1, 2020, the user may perform the second input, to be specific, input 2020.05.01 in the scratchpad completion time 68, so that the electronic device can update the scratchpad completion time of the first scratchpad to "2020.05.01", and the electronic device can remind the user to complete the operation of making a paper airplane before May 1, 2020.

Step 206: The electronic device generates the first scratchpad based on content in the scratchpad content editing area and the scratchpad attribute editing area.

In this embodiment of the present invention, after the user triggers the electronic device to update the scratchpad attribute in the scratchpad attribute editing area, the electronic device may generate the first scratchpad based on the content in the scratchpad content editing area and the scratchpad attribute editing area.

Further, the electronic device may display the first scratchpad.

The scratchpad creation method provided in this embodiment of the present invention may be applied to a scenario in which the user needs to watch a video corresponding to a tutorial step and does not need to pause or rewind the video. Because the user can view the scratchpad attribute of the first scratchpad on the scratchpad editing interface and set the scratchpad attribute of the first scratchpad according to a requirement of the user, the scratchpad can be set more flexibly, so that scratchpad content can better adapt to an actual use requirement of the user.

Optionally, in this embodiment of the present invention, after the user completes some operation steps according to the operation steps in the first video file, if the user needs to mark the some completed operation steps, the user may perform an input (for example, a third input described below) to trigger the electronic device to update a progress identifier that corresponds to a video identifier corresponding to the completed operation steps, so that the user can view the completed operation steps.

For example, with reference to FIG. 5, as shown in FIG. 8, after step 203, the scratchpad creation method provided in this embodiment of the present invention may further include the following step 207 to step 209.

Step 207: The electronic device receives a third input performed by the user.

Step 208: The electronic device collects an image of a target object in response to the third input, to obtain a first image.

The third input may be an input performed by the user on a first identifier or an input performed on a photographing application icon, and the third input may be used to trigger photographing or video recording.

Optionally, in this embodiment of the present invention, the first identifier may include any one of the N progress identifiers or a second identifier on the scratchpad editing interface.

The second identifier may be an identifier, on the scratchpad editing interface, that is used for the user to trigger photographing, and the shape, size, and color of the second identifier may be specifically determined according to an actual use requirement. This is not limited in this embodiment of the present invention.

In this embodiment of the present invention, the target object is an object obtained by the user completing some operation steps according to the operation steps in the first video file. For example, assuming that the content of the first video file is making a paper airplane, after the user completes a step of cutting paper, the paper obtained through cutting is the target object.

Optionally, in this embodiment of the present invention, in a case that the third input is the input performed by the user on the first identifier, the third input may include a first sub-input and a second sub-input. The first sub-input may be an input performed by the user on the first identifier, and the second sub-input may be an input of triggering, by the user, the electronic device to collect the image of the target object. Specifically, the user may perform the first sub-input on the first identifier to trigger the electronic device to display an interface (which may be the video recording interface or a photo shooting interface) of the camera application program, and then the user triggers the electronic device to collect the image of the target object. In this way, an operation process of the third input is completed. After the electronic device receives the third input performed by the user, the electronic device may collect the image of the target object in response to the third input, to obtain the first image.

Optionally, in this embodiment of the present invention, in a case that the third input is the input performed by the user on the photographing application icon (for example, a camera application icon), the third input may include a third sub-input and a fourth sub-input. The third sub-input may be an input performed by the user on the photographing application icon, and the fourth sub-input may be an input of triggering, by the user, the electronic device to collect the image of the target object. Specifically, the user may perform the third sub-input on the photographing application icon to trigger the electronic device to display an interface of the camera application program, and then the user triggers the electronic device to collect the image of the target object. In this way, an operation process of the third input is completed. After the electronic device receives the third input performed by the user, the electronic device may collect the image of the target object in response to the third input, to obtain the first image.

Step 209: The electronic device updates T of the N video clip progress identifiers based on the first image and the N video clips.

T is a positive integer, and T≤N.

In this embodiment of the present invention, after the electronic device obtains the first image, the electronic device may update the T video clip progress identifiers of the N video clip progress identifiers based on the first image and the N video clips.

Optionally, in this embodiment of the present invention, step 209 may be specifically implemented by the following step 209a and step 209b.

Step 209a: The electronic device determines the $i^{th}$ video clip of the N video clips.

A second image in the $i^{th}$ video clip matches the first image, i is a positive integer, and i≤N.

In this embodiment of the present invention, after the electronic device obtains the first image, the electronic device may sequentially perform matching between the first image and each frame of image (that is, each image) in each of the N video clips until the second image that matches the first image is found, and determine a video clip in which the second image is located as the $i^{th}$ video clip.

Optionally, in this embodiment of the present invention, the electronic device may perform matching between a characteristic point of the first image and a characteristic point of each image in each of the N video clips, to determine the second image.

Optionally, in this embodiment of the present invention, that the first image matches the second image may be any one of the following cases: The first image is the same as the second image, or a matching degree between the first image and the second image is greater than a preset matching threshold.

Step 209b: The electronic device updates a video clip progress identifier corresponding to the $i^{th}$ video clip to first progress.

The first progress may be a percentage of a video time corresponding to the second image in the $i^{th}$ video clip to total video duration of the $i^{th}$ video clip.

In this embodiment of the present invention, after the electronic device determines the $i^{th}$ video clip, the electronic device may update the video clip progress identifier corresponding to the $i^{th}$ video clip based on the percentage of the video time corresponding to the second image in the $i^{th}$ video clip to the total video duration of the $i^{th}$ video clip.

In this embodiment of the present invention, after the user completes some operation steps according to the operation steps in the first video file, if the user needs to mark the some completed operation steps, the user may directly trigger the electronic device to collect an image of an object on which the some operation steps are completed, so that the electronic device can automatically perform analysis, matching, and the like, and update corresponding progress information based on results of the analysis, matching, and the like. In this way, the user can view the completed operation steps, thereby further improving flexibility of setting a scratchpad.

Optionally, in this embodiment of the present invention, after the electronic device determines the $i^{th}$ video clip of the N video clips, the electronic device may first determine whether video clip progress identifiers corresponding to the first video clip to the $(i–1)^{th}$ video clip of the N video clips include a video clip progress identifier that corresponds to a video clip and that has not been updated to a completed state. If the electronic device determines that the video clip progress identifiers corresponding to the first video clip to the $(i–1)^{th}$ video clip of the N video clips include video clip progress identifiers that correspond to some video clips and that have not been updated to a completed state, the electronic device may update the video clip progress identifiers corresponding to the video clips to a completed state, and update the video clip progress identifier corresponding to the $i^{th}$ video clip to the first progress. If the electronic device determines that the video clip progress identifiers corresponding to the first video clip to the $(i–1)^{th}$ video clip of the N video clips do not include a video clip progress identifier that corresponds to a video clip and that has not been updated to a completed state, the electronic device may directly update the video clip progress identifier corresponding to the $i^{th}$ video clip to the first progress.

For example, after step 209a, the scratchpad creation method provided in this embodiment of the present invention may further include the following step 2010.

Step 2010: In a case that video clip progress identifiers corresponding to S video clips of the first video clip to the $(i–1)^{th}$ video clip have not been updated to a completed state, the electronic device updates the video clip progress identifiers corresponding to the S video clips to second progress.

The second progress may indicate the completed state, S is a positive integer, and S≤i–1.

In this embodiment of the present invention, the first video clip to the $(i–1)^{th}$ video clip may be video clips that are located before the $i^{th}$ video clip in terms of time.

It can be understood that, in a case that the electronic device automatically plays the first video, the electronic device may first play the first video clip to the $(i–1)^{th}$ video clip, and then play the $i^{th}$ video clip.

For example, it is assumed that the electronic device splits the first video file into five video clips. After the electronic device obtains the first image, if the electronic device determines that the first image matches a second image in the second video clip (total duration is 1 hour (h)) of the five video clips, the electronic device may update a video clip progress identifier corresponding to the second video clip to "20%" based on that the second image is at a time of 0.2 h in the second video clip. Further, if the electronic device determines that a video clip progress identifier corresponding to the first video clip of the five video clips has not been updated to a completed state, the electronic device may update the video clip progress identifier corresponding to the first video clip to a completed state.

It should be noted that video clip progress identifiers corresponding to the third video clip, the fourth video clip, and the fifth video clip of the five video clips may be null or 0%.

The scratchpad creation method provided in this embodiment of the present invention may be applied to a scenario in which the user needs to watch a video corresponding to a tutorial step and does not need to pause or rewind the video. After the user triggers the electronic device to collect an image of an object on which some operation steps are completed, the electronic device may automatically update a video clip progress identifier corresponding to a video clip ahead of the operation step, so that the user can view the completed operation steps, thereby further improving flexibility of setting a scratchpad.

Optionally, in this embodiment of the present invention, after the electronic device generates a plurality of scratchpads, the electronic device may display entry identifiers of the scratchpads, so that the user can view the scratchpads. Further, the user may perform an input on an entry identifier of a scratchpad among the entry identifiers of the scratchpads to trigger the electronic device to display a scratchpad editing interface of the scratchpad.

For example, with reference to FIG. 2, as shown in FIG. 9, after step 202, the scratchpad creation method provided in this embodiment of the present invention may further include the following step 2011 and step 2012.

Step 2011: The electronic device displays at least one scratchpad entry identifier.

The at least one scratchpad entry identifier may include an entry identifier of the first scratchpad.

Figure 10:
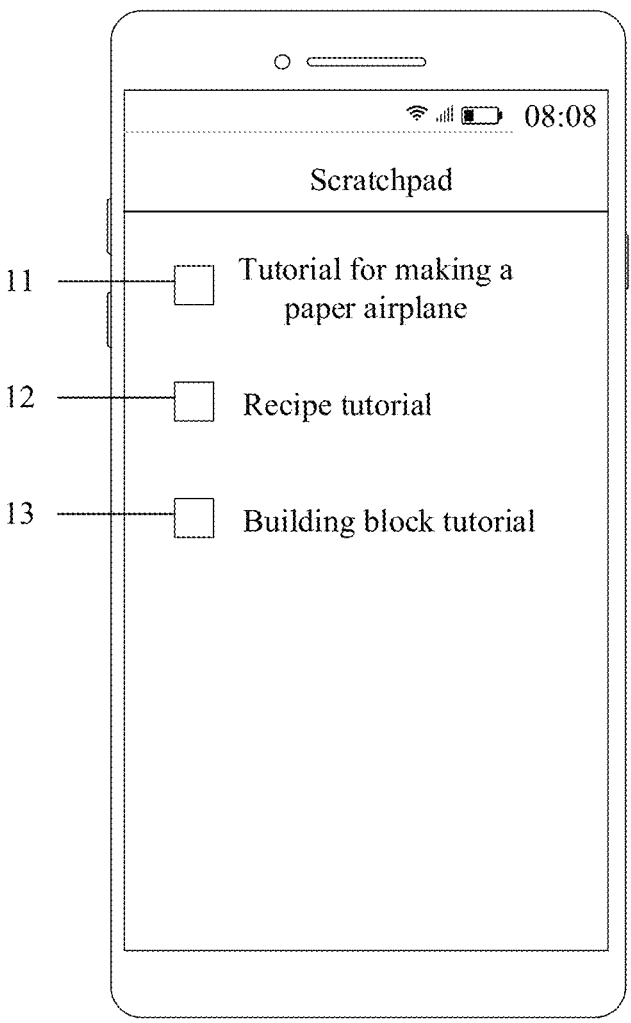
FIG. 10 is a fourth schematic diagram of an interface to which a scratchpad creation method according to an embodiment of the present invention is applied.

For example, FIG. 10 is a schematic diagram in which the electronic device displays an entry identifier of at least one scratchpad, including an entry identifier "tutorial for making a paper airplane" of a scratchpad indicated by 11, an entry identifier "recipe tutorial" of a scratchpad indicated by 12, and an entry identifier "building block tutorial" of a scratchpad indicated by 13.

Optionally, in this embodiment of the present invention, the entry identifier of the first scratchpad is determined based on the content of the first video file.

For example, it is assumed that the content of the first video file is making a paper airplane, the electronic device may determine that the entry identifier of the first scratchpad is "tutorial for making a paper airplane"; or it is assumed that the content of the first video file is scrambled eggs with tomatoes, the electronic device may determine that the entry identifier of the first scratchpad is "tutorial for scrambled eggs with tomatoes". Further, after determining the entry identifier of the first scratchpad, the electronic device may display the entry identifier.

Step 2012: In a case that the electronic device receives a fourth input performed by the user on the entry identifier of the first scratchpad, the electronic device displays a scratchpad editing interface of the first scratchpad in response to the fourth input.

Optionally, in this embodiment of the present invention, the fourth input may be a tap input, a touch-and-hold input, a heavy-touch input, or another other possible forms of inputs. Specifically, this may be determined based on an actual use requirement, and is not limited in this embodiment of the present invention.

In this embodiment of the present invention, after the electronic device receives the fourth input performed by the user, the electronic device may display the scratchpad editing interface of the first scratchpad in response to the fourth input.

Further, the user may then trigger the electronic device to perform the step 204 to the step 2010.

In this embodiment of the present invention, because the electronic device can display the entry identifier of the first scratchpad, the user can view the first scratchpad, thereby improving performance of human-computer interaction.

Further, because the user can perform an input on an entry identifier of a scratchpad to trigger the electronic device to display a scratchpad editing interface of the scratchpad, the user can quickly enter the scratchpad editing interface of the scratchpad.

Optionally, in this embodiment of the present invention, in a case that the electronic device has generated the first scratchpad, the user may further trigger the electronic device to save an association between another video file (for example, a video file different from the video file for which the first scratchpad is created) and the first scratchpad.

For example, with reference to FIG. 9, as shown in FIG. 11, after step 2012, the scratchpad creation method provided in this embodiment of the present invention may further include the following step 2013 and step 2014.

Step 2013: The electronic device receives a fifth input performed by the user on a video thumbnail of a second video file and the scratchpad entry identifier of the first scratchpad.

Optionally, in this embodiment of the present invention, the fifth input may be an input of the user dragging the video thumbnail of the second video file to the entry identifier of the first scratchpad, or may be an input of the user tapping the video thumbnail of the second video file and the entry identifier of the first scratchpad, respectively, or the like. Specifically, this may be determined based on an actual use requirement, and is not limited in this embodiment of the present invention.

In this embodiment of the present invention, the user may drag the video thumbnail of the second video file to a video preview screen, to trigger the electronic device to display a scratchpad interface. Then the user may further drag the video thumbnail of the second video file to the entry identifier of the first scratchpad. In this way, the input of the user dragging the video thumbnail of the second video file to the entry identifier of the first scratchpad, that is, an operation process of the fifth input, is completed.

Step 2014: In response to the fifth input, the electronic device adds, to the first scratchpad, P video identifiers, description information corresponding to each video identifier, and P video clip progress identifiers corresponding to the P video identifiers.

Each of the P video identifiers corresponds to one of P video clips, the P video clips are video clips obtained by dividing the second video file based on content of the second video file, and P is a positive integer.

In this embodiment of the present invention, after the electronic device receives the fifth input performed by the user, in response to the fifth input, the electronic device may split the second video file into the P video clips based on the content of the second video file. In this way, after the user performs an input on the entry identifier of the first scratchpad, the electronic device may add, to the first scratchpad, the P video identifiers, the description information corresponding to each video identifier, and the P video clip progress identifiers corresponding to the P video identifiers.

Further, the electronic device may further save an association between the second video file and the first scratchpad.

For other descriptions such as the division of the second video file, reference may be made to related descriptions of the first video file in the foregoing embodiment. To avoid repetition, details are not described herein again.

Figure 12:
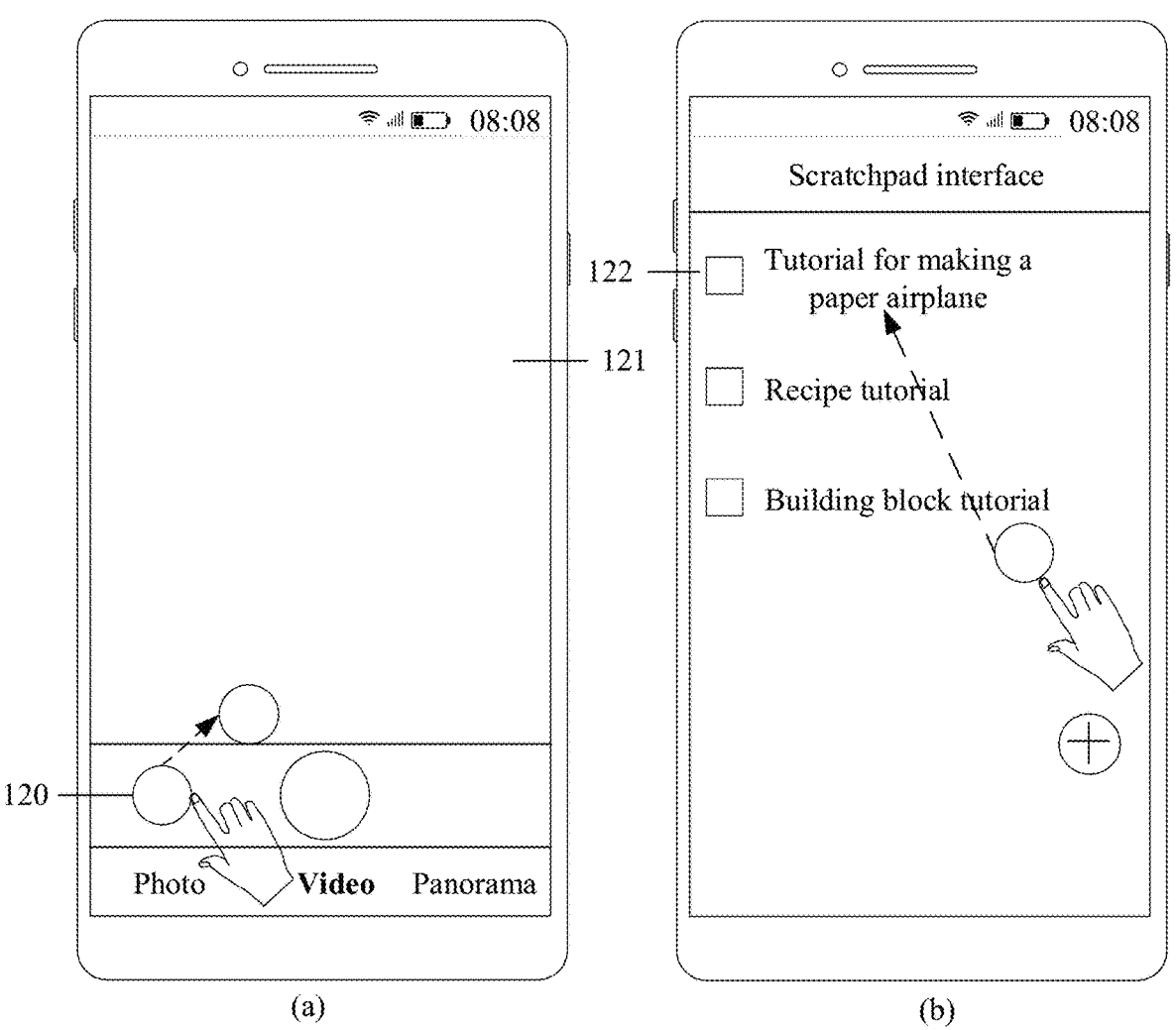
FIG. 12 is a fifth schematic diagram of an interface to which a scratchpad creation method according to an embodiment of the present invention is applied.

The following further describes steps 2013 and 2014 by using an example with reference to FIG. 12.

For example, it is assumed that the fifth input is the input of dragging the video thumbnail of the second video file to the entry identifier of the first scratchpad. As shown in (a) in FIG. 12, when the user drags a video thumbnail 120 of the second video file to a video preview screen 121, as shown in (b) in FIG. 12, the electronic device may update a video recording interface to display a scratchpad interface, where the scratchpad interface may include a scratchpad adding control and an entry identifier of at least one scratchpad, and an entry identifier 122 is the entry identifier of the first scratchpad. Then the user continues to drag the video thumbnail 120 of the second video file to the entry identifier 122, to trigger the electronic device to add, to the first scratchpad, the P video identifiers, the description information corresponding to each video identifier, and the P video clip progress identifiers corresponding to the P video identifiers. Further, the electronic device may save the association between the second video file and the first scratchpad.

In this embodiment of the present invention, because the user can perform an input to trigger the electronic device to automatically create a scratchpad for the second video file whose content is similar to that of the first video file, the user can simultaneously view a plurality of video files with similar content by using the scratchpad.

Optionally, in this embodiment of the present invention, the entry identifier of the at least one scratchpad may be displayed on a target interface. The target interface may include a scratchpad interface, a desktop, a lock screen interface, or a program interface of any application program installed on the electronic device. Specifically, this may be determined based on an actual use requirement, and is not limited in this embodiment of the present invention.

Optionally, in this embodiment of the present invention, in a case that the entry identifier of the at least one scratchpad includes the entry identifier of the first scratchpad, the target interface may further include an overall video progress identifier corresponding to the first scratchpad. The overall video progress identifier may indicate overall completion progress of a user operation performed on the first video file.

It should be noted that the overall completion progress may be understood as progress of a user operation with respect to the first video file. For example, it is assumed that total duration of the first video file is 100 minutes (min) and a time point of the user operation is at the $60^{th}$ minute in the first video file, the overall completion progress of the user operation can be considered as 60%.

Optionally, in this embodiment of the present invention, after the electronic device updates the video clip progress identifier corresponding to the $i^{th}$ video clip to the first progress, the electronic device may update, based on the first progress, progress information indicated by the overall video progress identifier, so that the user can accurately learn of an actual completion status of the user operation.

For example, after step 209_b_, the scratchpad creation method provided in this embodiment of the present invention may further include the following step 2015.

Step 2015: The electronic device updates, based on the first progress, the progress information indicated by the overall video progress identifier.

It can be understood that the progress information indicated by the overall video progress identifier may be updated in real time based on the progress of the user operation.

For example, it is assumed that the content of the first video file is a paper airplane and the first video file may be split into three video clips, where content of the first video clip is choosing color of paper, content of the second video clip is cutting the paper, and content of the third video clip is making a paper airplane. After the electronic device updates a video clip progress identifier corresponding to the first video clip to a completed state, the electronic device may update the progress information indicated by the overall video progress identifier from 0% to 33%; or after the electronic device updates an overall video progress identifier corresponding to the first video clip to 80%, the electronic device may update the progress information indicated by the video clip progress identifier from 0% to 33%×0.8, that is, 26.4%.

Optionally, in this embodiment of the present invention, if the user has not completed an operation related to the first video file within a time corresponding to the scratchpad completion time, the electronic device may display a first strikethrough at display locations of the entry identifier and the overall video progress identifier of the first scratchpad.

Optionally, in this embodiment of the present invention, if the user has completed an operation related to the first video file within a time corresponding to the scratchpad completion time, the electronic device may display a second strikethrough at display locations of the entry identifier and the overall video progress identifier of the first scratchpad.

Figure 13:
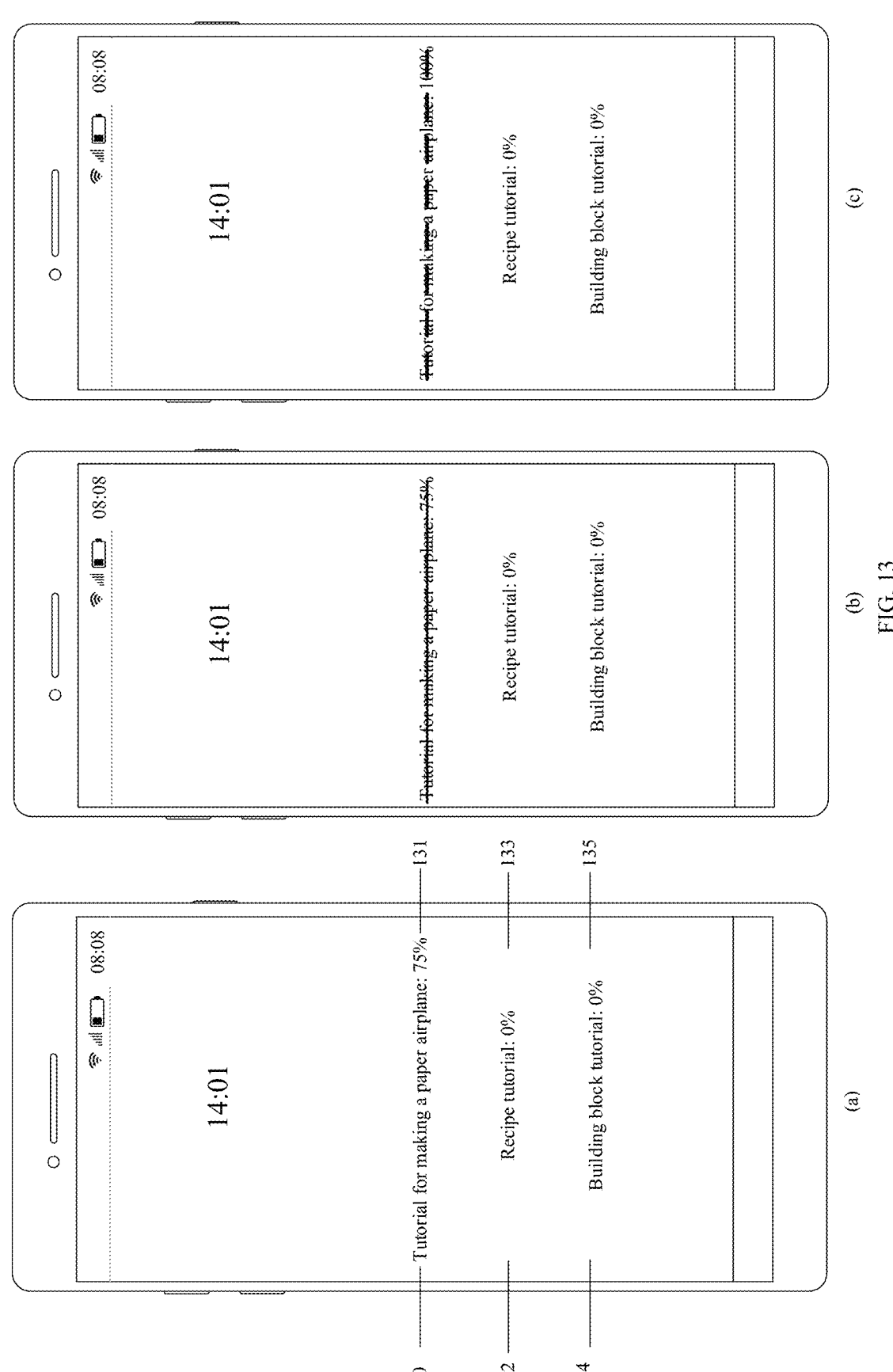
FIG. 13 is a sixth schematic diagram of an interface to which a scratchpad creation method according to an embodiment of the present invention is applied.

For example, it is assumed that the electronic device is in a lock screen state, the first strikethrough is a solid strikethrough, and the second strikethrough is a dashed strikethrough. (a) in FIG. 13 is a schematic diagram of a lock screen interface of the electronic device. The lock screen interface includes an entry identifier "tutorial for making a paper airplane" of a scratchpad 130, an overall video progress identifier 131 corresponding to the scratchpad 130, an entry identifier "recipe tutorial" of a scratchpad 132, an overall video progress identifier 133 corresponding to the scratchpad 132, an entry identifier "building block tutorial" of a scratchpad 134, and an overall video progress identifier 135 corresponding to the scratchpad 134, where the scratchpad 130 is the first scratchpad. In a case that the user has not completed the operation related to the first video file within the time corresponding to the scratchpad completion time, as shown in (b) in FIG. 13, the electronic device may display a solid strikethrough at the display locations of the entry identifier and the overall video progress identifier of the first scratchpad. In a case that the user has completed the operation related to the first video file within the time corresponding to the scratchpad completion time, as shown in (c) in FIG. 13, the electronic device may display a dashed strikethrough at the display locations of the entry identifier and the overall video progress identifier of the first scratchpad.

The scratchpad creation method provided in this embodiment of the present invention may be applied to a scenario in which the user needs to view an actual completion status of an operation related to the first video file when the electronic device is in a lock screen state. Because the electronic device can update and display first progress information in real time based on the actual completion status of the operation related to the first video file, the actual completion status of the user operation can be accurately recorded, so that the user can accurately learn of the actual completion status of the user operation when the electronic device is in the lock screen state, and the user can view the actual completion status of the user operation in real time.

It should be noted that, in the embodiments of the present invention, the scratchpad creation methods shown in the foregoing method drawings are all described with reference to an accompanying drawing in the embodiments of the present invention as an example. During specific implementation, the scratchpad creation methods shown in the forgoing method drawings may be alternatively implemented with reference to any other appropriate accompanying drawings described in the foregoing embodiments. Details are not described herein.

Figure 14:
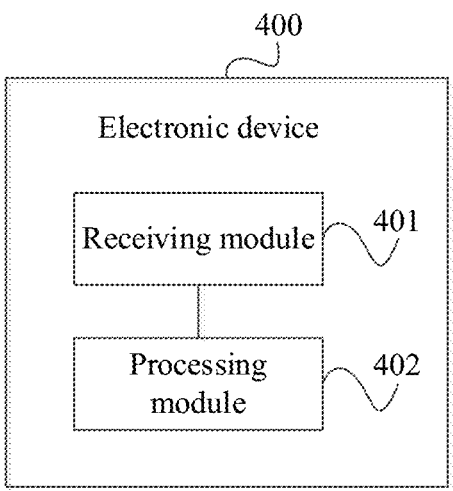
FIG. 14 is a schematic structural diagram of an electronic device according to an embodiment of the present invention.

As shown in FIG. 14, an embodiment of the present invention provides an electronic device 400. The electronic device 400 may include a receiving module 401 and a processing module 402. The receiving module 401 may be configured to receive a first input performed by a user on a target identifier, where the target identifier is associated with a first video file. The processing module 402 may be configured to display a first scratchpad in response to the first input received by the receiving module 401, where the first scratchpad is a scratchpad created based on content of the first video file, the first scratchpad includes at least one video identifier and at least one video clip progress identifier, the video identifier is used to indicate a video clip in the first video file, and the video clip progress identifier is used to indicate completion progress of an operation corresponding to the video clip.

Optionally, in this embodiment of the present invention, the receiving module 401 may be specifically configured to receive the first input performed by the user on the target identifier displayed on a video recording interface of the first video file; and the processing module 402 may be specifically configured to display the first scratchpad in a case that an input characteristic of the first input is a preset input characteristic.

In this embodiment of the present invention, the user may perform an input on the target identifier on the video recording interface to trigger the electronic device to switch to the scratchpad interface, so that the user can quickly enter the scratchpad interface.

Optionally, in this embodiment of the present invention, the processing module 402 may be further configured to: after the receiving module 401 receives the first input performed by the user on the target identifier and before the first scratchpad is displayed, display a scratchpad editing interface of the first scratchpad, where the scratchpad editing interface includes a scratchpad content editing area, and the scratchpad content editing area includes N video identifiers, description information corresponding to each video identifier, and N video clip progress identifiers corresponding to the N video identifiers. Each video identifier corresponds to one of N video clips, the N video clips are video clips obtained by dividing the first video file based on the content of the first video file, and N is a positive integer.

In this embodiment of the present invention, because the user can view a division status of the first video file on the scratchpad editing interface and set content of the first scratchpad according to a requirement of the user, the scratchpad can be set more flexibly, so that scratchpad content can better adapt to an actual use requirement of the user.

Further, because the electronic device can split the first video file into the N video clips based on the content of the first video file, when the user needs to watch a video clip in the first video file, the user can accurately and quickly find the video clip among the N video clips, thereby avoiding an operation of triggering, by the user a plurality of times, the electronic device to play back the first video file to look for the video clip.

Furthermore, because the electronic device can recognize the content of the first video file based on an AI technology and the AI technology can obtain information about use habits of Internet users, the N video clips obtained through division by the electronic device adapt to requirements of different users.

Optionally, in this embodiment of the present invention, the scratchpad editing interface further includes a scratchpad attribute editing area, and the scratchpad attribute editing area includes at least one scratchpad attribute of the first scratchpad. The receiving module 401 is further configured to: after the processing module 402 displays the scratchpad editing interface of the first scratchpad, receive a second input performed by the user on the scratchpad attribute editing area; and the processing module 402 is further configured to: update at least one scratchpad attribute of the first scratchpad in response to the second input received by the receiving module 401, and generate the first scratchpad based on content in the scratchpad content editing area and the scratchpad attribute editing area, where the scratchpad attribute includes at least one of the following: a scratchpad subject, a scratchpad reminder time, and a scratchpad completion time.

In this embodiment of the present invention, because the user can view the scratchpad attribute of the first scratchpad on the scratchpad editing interface and set the scratchpad attribute of the first scratchpad according to a requirement of the user, the scratchpad can be set more flexibly, so that scratchpad content can better adapt to an actual use requirement of the user.

Optionally, in this embodiment of the present invention, the receiving module 401 may be further configured to receive a third input performed by the user, where the third input is an input performed on the first identifier or an input performed on a photographing application icon, and the third input is used to trigger photographing or video recording; and the processing module 402 is further configured to: collect an image of a target object in response to the third input received by the receiving module 401, to obtain a first image, and update T video clip progress identifiers of the N video clip progress identifiers based on the first image and the N video clips, where the first identifier includes any one of the N video clip progress identifiers or a second identifier on the scratchpad editing interface, T is a positive integer, and $T \leq N$.

In this embodiment of the present invention, after the user completes some operation steps according to the operation steps in the first video file, if the user needs to mark the some completed operation steps, the user may directly trigger the electronic device to collect an image of an object on which the some operation steps are completed, so that the electronic device can automatically perform analysis, matching, and the like, and update corresponding progress information based on results of the analysis, matching, and the like. In this way, the user can view the completed operation steps, thereby further improving flexibility of setting a scratchpad.

Optionally, in this embodiment of the present invention, the processing module 402 may be specifically configured to: determine the $i^{th}$ video clip of the N video clips, and update a video clip progress identifier corresponding to the $i^{th}$ video clip to first progress, where a second image in the $i^{th}$ video clip matches the first image, the first progress is a percentage of a video time corresponding to the second image in the $i^{th}$ video clip to total video duration of the $i^{th}$ video clip, i is a positive integer, and $i \leq N$.

Optionally, in this embodiment of the present invention, the processing module 402 may be further configured to: after determining the $i^{th}$ video clip of the N video clips, in a case that video clip progress identifiers corresponding to S video clips of the first video clip to the $(i-1)^{th}$ video clip have not been updated to a completed state, update the video clip progress identifiers corresponding to the S video clips to second progress, where the second progress indicates the completed state, S is a positive integer, and $S \leq i-1$.

In this embodiment of the present invention, after the user triggers the electronic device to collect an image of an object on which some operation steps are completed, the electronic device may automatically update a progress identifier corresponding to a video clip ahead of the operation step, so that the user can view the completed operation steps, thereby further improving flexibility of setting a scratchpad.

Optionally, in this embodiment of the present invention, the processing module 402 may be further configured to: display an entry identifier of at least one scratchpad, and in a case that a fourth input performed by the user on the entry identifier of the first scratchpad is received, display a scratchpad editing interface of the first scratchpad in response to the fourth input, where the entry identifier of the at least one scratchpad includes an entry identifier of the first scratchpad, and the entry identifier of the first scratchpad is determined based on the content of the first video file.

In this embodiment of the present invention, because the electronic device can display the entry identifier of the first scratchpad, the user can view the first scratchpad, thereby improving performance of human-computer interaction.

Optionally, in this embodiment of the present invention, the receiving module 401 may be further configured to receive a fifth input performed by the user on a video thumbnail of a second video file and the scratchpad entry identifier of the first scratchpad; and the processing module 402 may be further configured to: in response to the fifth input received by the receiving module 401, add, to the first scratchpad, P video identifiers, description information corresponding to each video identifier, and P video clip progress identifiers corresponding to the P video identifiers, where each video identifier corresponds to one of P video clips, the P video clips are video clips obtained by dividing the second video file based on content of the second video file, and P is a positive integer.

In this embodiment of the present invention, because the user can perform an input to trigger the electronic device to automatically create a scratchpad for the second video file whose content is similar to that of the first video file, the user can simultaneously view a plurality of video files with similar content by using the scratchpad.

Optionally, in this embodiment of the present invention, the entry identifier of the at least one scratchpad is displayed on a target interface, the target interface further includes an overall video progress identifier corresponding to the first scratchpad, and the overall video progress identifier is used to indicate overall completion progress of a user operation performed on the first video file; and the processing module 402 may be further configured to: after updating the progress identifier corresponding to the $i^{th}$ video clip to the first progress, update, based on the first progress, a progress status indicated by the overall video progress identifier.

In this embodiment of the present invention, because the electronic device can update and display first progress information in real time based on the actual completion status of the operation related to the first video file, the actual completion status of the user operation can be accurately recorded, so that the user can accurately learn of the actual completion status of the user operation, and the user can view the actual completion status of the user operation in real time, thereby improving performance of human-computer interaction.

The electronic device provided in this embodiment of the present invention is capable of implementing the processes implemented by the electronic device in the foregoing method embodiments. To avoid repetition, details are not described herein again.

This embodiment of the present invention provides an electronic device. The electronic device may receive a first input performed by a user on a target identifier (associated with a first video), and display a first scratchpad in response to the first input, where the first scratchpad is a scratchpad created based on content of the first video, the first scratchpad includes at least one video identifier and at least one video clip progress identifier, the video identifier is used to indicate a video clip in the first video file, and the video clip progress identifier is used to indicate completion progress of an operation corresponding to the video clip. In this solution, after the user performs an input on an identifier associated with a video file (for example, a video thumbnail or a video recording control), the electronic device may be triggered to automatically generate a scratchpad based on content of the video file, and the scratchpad includes at least one video identifier and at least one video clip progress identifier. In this case, when the user needs to watch a specific video clip in the video file, the user may tap a video identifier corresponding to the video clip to find the video clip required by the user, and the user does not need to repeatedly trigger the electronic device to pause playing or rewind the video file, so that the user can flexibly and quickly perform an operation according to the video file.

Figure 15:
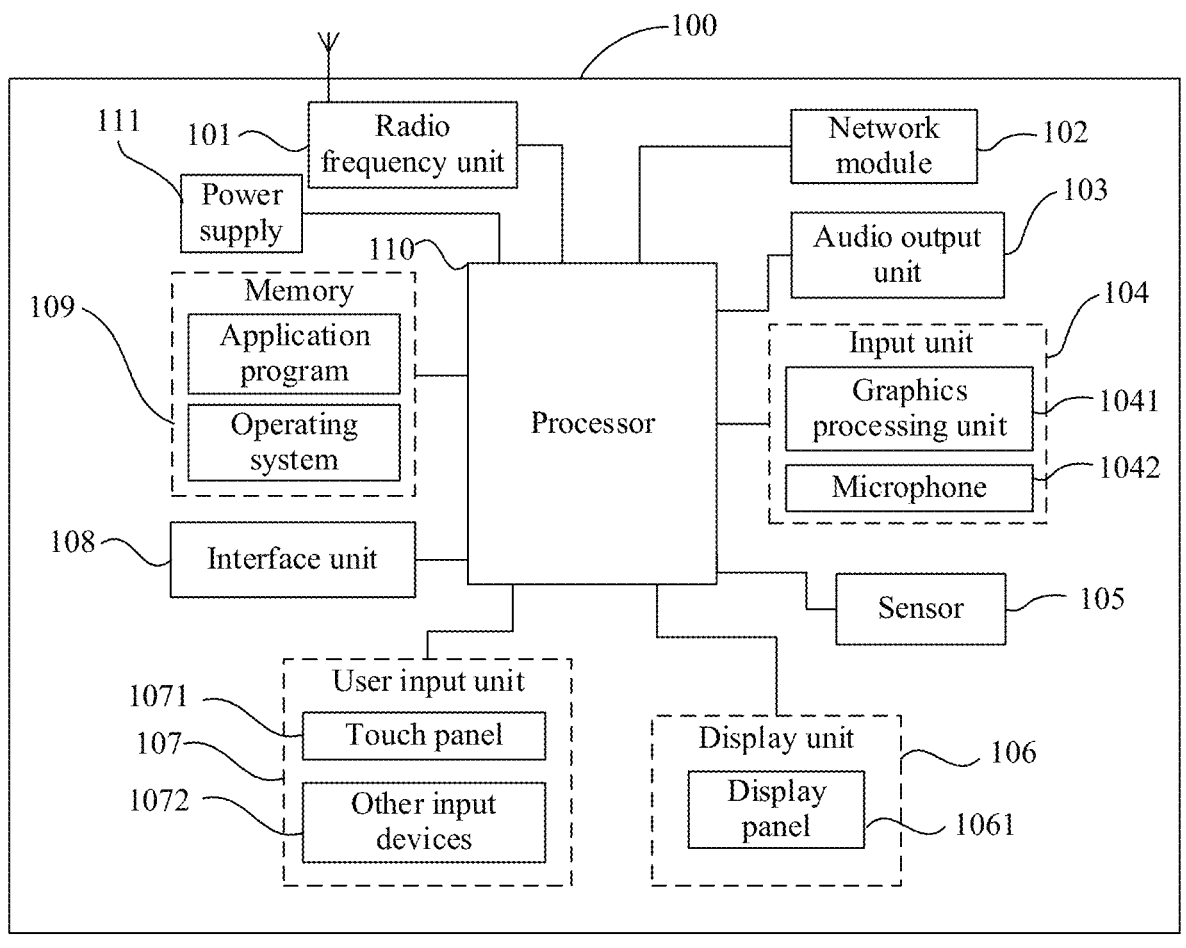
FIG. 15 is a schematic diagram of hardware of an electronic device according to an embodiment of the present invention.

FIG. 15 is a schematic diagram of hardware of an electronic device for implementing the embodiments of the present invention. As shown in FIG. 15, the electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art can understand that the structure of the electronic device shown in FIG. 15 does not constitute a limitation on the electronic device. The electronic device may include more or fewer components than those shown in the figure, or some components may be combined, or there may be a different component layout. In this embodiment of the present invention, the electronic device includes but is not limited to a mobile phone, a tablet computer, a notebook computer, a palmtop computer, a vehicle-mounted terminal, a wearable device, a pedometer, and the like.

The user input unit 107 may be configured to receive a first input performed by a user on a target identifier, and the display unit 106 may be configured to display a first scratchpad in response to the first input received by the user input unit 107, where the target identifier is associated with a first video file, the first scratchpad is a scratchpad created based on content of the first video file, the first scratchpad includes at least one video identifier and at least one video clip progress identifier, the video identifier is used to indicate a video clip in the first video file, and the video clip progress identifier is used to indicate completion progress of an operation corresponding to the video clip.

It can be understood that, in this embodiment of the present invention, the receiving module 401 in the schematic structural diagram (for example, FIG. 14) of the foregoing electronic device may be implemented by the user input unit 107, and the processing module 402 in the schematic structural diagram (for example, FIG. 14) of the foregoing electronic device may be implemented by the display unit 106.

This embodiment of the present invention provides an electronic device. The electronic device may receive a first input performed by a user on a target identifier (associated with a first video), and display a first scratchpad in response to the first input, where the first scratchpad is a scratchpad created based on content of the first video, the first scratchpad includes at least one video identifier and at least one video clip progress identifier, the video identifier is used to indicate a video clip in the first video file, and the video clip progress identifier is used to indicate completion progress of an operation corresponding to the video clip. In this solution, after the user performs an input on an identifier associated with a video file (for example, a video thumbnail or a video recording control), the electronic device may be triggered to automatically generate a scratchpad based on content of the video file, and the scratchpad includes at least one video identifier and at least one video clip progress identifier. In this case, when the user needs to watch a specific video clip in the video file, the user may tap a video identifier corresponding to the video clip to find the video clip required by the user, and the user does not need to repeatedly trigger the electronic device to pause playing or rewind the video file, so that the user can flexibly and quickly perform an operation according to the video file.

It should be understood that in this embodiment of the present invention, the radio frequency unit 101 may be configured to receive and transmit signals in an information reception or transmission or call process. Specifically, after receiving downlink data from a base station, the radio frequency unit 101 transmits the downlink data to the processor 110 for processing, and in addition, transmits uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may further communicate with a network and another device by using a wireless communications system.

The electronic device provides wireless broadband Internet access for a user by using the network module 102, for example, helps the user transmit and receive emails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal received sound or a message received sound) related to a specific function performed by the electronic device 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. A processed image frame may be displayed on the display unit 106. The image frame processed by the graphics processing unit 1041 may be stored in the memory 109 (or another storage medium) or transmitted by the radio frequency unit 101 or the network module 102. The microphone 1042 may receive sounds and process such sounds into audio data. The processed audio data may be converted in a telephone call mode into a format that can be transmitted by the radio frequency unit 101 to a mobile communications base station, for outputting.

The electronic device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the electronic device 100 moves to an ear, the proximity sensor may turn off the display panel 1061 and/or backlight. As a motion sensor, an accelerometer sensor may detect magnitudes of accelerations in all directions (usually three axes), may detect a magnitude and a direction of gravity when in a static state, and may be applied to posture recognition (for example, landscape/portrait mode switching, a related game, or magnetometer posture calibration) of the electronic device, a function associated with vibration recognition (for example, a pedometer or a keystroke), or the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein.

The display unit 106 is configured to display information input by the user or information provided for the user. The display unit 106 may include the display panel 1061, and the display panel 1061 may be configured in a form of a liquid crystal display (LCD), organic light-emitting diodes (OLED), or the like.

The user input unit 107 may be configured to receive input digital or character information and generate key signal input related to user setting and function control of the electronic device. Specifically, the user input unit 107 includes a touch panel 1071 and other input devices 1072. The touch panel 1071, also referred to as a touchscreen, may collect a touch operation performed by a user on or near the touch panel 1071 (for example, an operation performed by the user on the touch panel 1071 or near the touch panel 1071 by using a finger or any appropriate object or accessory such as a stylus). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 110, receives a command transmitted by the processor 110, and executes the command. In addition, the touch panel 1071 may be implemented in a plurality of types, for example, a resistive type, a capacitive type, an infrared type, and a surface acoustic wave type. In addition to the touch panel 1071, the user input unit 107 may further include the other input devices 1072. Specifically, the other input devices 1072 may include but are not limited to a physical keyboard, a function key (such as a volume control key or an on/off key), a trackball, a mouse, and a joystick. Details are not described herein.

Further, the touch panel 1071 may cover the display panel 1061. After detecting a touch operation on or near the touch panel 1071, the touch panel 1071 transmits the touch operation to the processor 110 to determine a type of a touch event. Then the processor 110 provides corresponding visual output on the display panel 1061 based on the type of the touch event. In FIG. 15, the touch panel 1071 and the display panel 1061 serve as two separate components to implement input and output functions of the electronic device. However, in some embodiments, the touch panel 1071 and the display panel 1061 may be integrated to implement the input and output functions of the electronic device. This is not specifically limited herein.

The interface unit 108 is an interface connecting an external apparatus to the electronic device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive an input (for example, data information or power) from an external apparatus and transmit the received input to one or more elements in the electronic device 100, or may be configured to transmit data between the electronic device 100 and the external apparatus.

The memory 109 may be configured to store software programs and various data. The memory 109 may mainly include a program storage area and a data storage area. The program storage area may store an operating system, an application program required by at least one function (for example, an audio play function or an image play function), and the like. The data storage area may store data (for example, audio data or a phone book) created based on usage of the mobile phone. In addition, the memory 109 may include a high-speed random access memory, or may include a nonvolatile memory, for example, at least one magnetic disk storage device or a flash memory device, or another volatile solid-state storage device.

The processor 110 is a control center of the electronic device, and is connected to all components of the electronic device by using various interfaces and lines. By running or executing a software program and/or module that is stored in the memory 109 and calling data stored in the memory 109, the processor 110 executes various functions of the electronic device and processes data, so as to perform overall monitoring on the electronic device. The processor 110 may include one or more processing units. Optionally, the processor 110 may integrate an application processor and a modem processor. The application processor mainly processes an operating system, a user interface, an application program, and the like. The modem processor mainly processes wireless communication. It can be understood that the modem processor may be alternatively not integrated in the processor 110.

The electronic device 100 may further include the power supply 111 (for example, a battery) that supplies power to each component. Optionally, the power supply 111 may be logically connected to the processor 110 by using a power management system, so as to implement functions such as charging management, discharging management, and power consumption management by using the power management system.

In addition, the electronic device 100 includes some functional modules that are not shown. Details are not described herein.

Optionally, an embodiment of the present invention further provides an electronic device, including a processor, a memory, and a computer program stored in the memory and capable of running on the processor. When the computer program is executed by the processor, the processes of the foregoing method embodiments are implemented, with the same technical effects achieved. To avoid repetition, details are not described herein again.

Optionally, an embodiment of the present invention further provides a computer-readable storage medium, where the computer-readable storage medium stores a computer program. When the computer program is executed by a processor, the processes of the foregoing method embodiments are implemented, with the same technical effects achieved. To avoid repetition, details are not described herein again. The computer-readable storage medium may include a read-only memory (ROM), a random access memory (RAM), a magnetic disk, an optical disc, or the like.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or a compact disc), and includes several instructions for instructing an electronic device (which may be a mobile phone, a computer, a server, an air conditioner, a network device, or the like) to perform the method described in each embodiment of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A scratchpad creation method, wherein the method comprises:

receiving a first input performed by a user on a target identifier, wherein the target identifier is associated with a first video file; and displaying a first scratchpad in response to the first input, wherein the first scratchpad is a scratchpad created based on content of the first video file, the first scratchpad comprises at least one video identifier and at least one video clip progress identifier, the video identifier is used to indicate a video clip in the first video file, and the video clip progress identifier is used to indicate a completion percentage of a user operation corresponding to the video clip, wherein the user operation is a manual operation performed by the user under guidance of the first video file;

wherein after the receiving a first input performed by a user on a target identifier and before the displaying a first scratchpad, the method further comprises:

displaying a scratchpad editing interface of the first scratchpad, wherein the scratchpad editing interface comprises a scratchpad content editing area, and the scratchpad content editing area comprises N video identifiers, description information corresponding to each video identifier, and N video clip progress identifiers corresponding to the N video identifiers, wherein N video clips are video clips obtained by dividing the first video file based on the content of the first video file, and N is a positive integer;

wherein the method further comprises:

receiving a third input performed by the user, wherein the third input is an input performed on a first identifier or an input performed on a photographing application icon, and the third input is used to trigger photographing or video recording;

collecting an image of a target object in response to the third input, to obtain a first image; and updating T video clip progress identifiers of the N video clip progress identifiers based on the first image and the N video clips, wherein the first identifier comprises any one of the N video clip progress identifiers or a second identifier on the scratchpad editing interface, T is a positive integer, and $T \leq N$.

2. The method according to claim 1, wherein the receiving a first input performed by a user on a target identifier comprises:

receiving the first input performed by the user on the target identifier displayed on a video recording interface of the first video file; and the displaying a first scratchpad in response to the first input comprises:

displaying the first scratchpad in a case that an input characteristic of the first input is a preset input characteristic.

3. The method according to claim 1, wherein the scratchpad editing interface further comprises a scratchpad attribute editing area, and the scratchpad attribute editing area comprises at least one scratchpad attribute of the first scratchpad; and after the displaying a scratchpad editing interface of the first scratchpad, the method further comprises:

receiving a second input performed by the user on the scratchpad attribute editing area;

updating at least one scratchpad attribute of the first scratchpad in response to the second input; and generating the first scratchpad based on content in the scratchpad content editing area and the scratchpad attribute editing area, wherein the scratchpad attribute comprises at least one of the following: a scratchpad subject, a scratchpad reminder time, and a scratchpad completion time.

4. The method according to claim 1, wherein the updating T video clip progress identifiers of the N video clip progress identifiers based on the first image and the N video clips comprises:

determining the $i^{th}$ video clip of the N video clips, wherein a second image in the $i^{th}$ video clip matches the first image; and updating a video clip progress identifier corresponding to the $i^{th}$ video clip to first progress, wherein the first progress is a percentage of a video time corresponding to the second image in the $i^{th}$ video clip to total video duration of the $i^{th}$ video clip, i is a positive integer, and $i \leq N$.

5. The method according to claim 4, wherein after the determining the $i^{th}$ video clip of the N video clips, the method further comprises:

in a case that video clip progress identifiers corresponding to S video clips of the first video clip to the $(i-1)^{th}$ video clip have not been updated to a completed state, updating the video clip progress identifiers corresponding to the S video clips to second progress, the second progress indicating the completed state, wherein S is a positive integer, and $S \leq i-1$.

6. The method according to claim 4, wherein an entry identifier of at least one scratchpad is displayed on a target interface, the target interface further comprises an overall video progress identifier corresponding to the first scratchpad, and the overall video progress identifier is used to indicate an overall completion percentage of a user operation performed on the first video file; and after the updating a video clip progress identifier corresponding to the $i^{th}$ video clip to first progress, the method further comprises:

updating, based on the first progress, a progress status indicated by the overall video progress identifier.

7. The method according to claim 1, wherein the method further comprises:

displaying an entry identifier of at least one scratchpad, wherein the entry identifier of the at least one scratchpad comprises an entry identifier of the first scratchpad, and the entry identifier of the first scratchpad is determined based on the content of the first video file; and in a case that a fourth input performed by the user on the entry identifier of the first scratchpad is received, displaying a scratchpad editing interface of the first scratchpad in response to the fourth input.

8. The method according to claim 7, wherein the method further comprises:

receiving a fifth input performed by the user on a video thumbnail of a second video file and the scratchpad entry identifier of the first scratchpad; and in response to the fifth input, adding, to the first scratchpad, P video identifiers, description information corresponding to each video identifier, and P video clip progress identifiers corresponding to the P video identifiers, wherein P video clips are video clips obtained by dividing the second video file based on content of the second video file, and P is a positive integer.

9. An electronic device, comprising a processor, a memory, and a computer program stored in the memory and capable of running on the processor, where the processor executes the computer program to:

receive a first input performed by a user on a target identifier, wherein the target identifier is associated with a first video file; and display a first scratchpad in response to the first input, wherein the first scratchpad is a scratchpad created based on content of the first video file, the first scratchpad comprises at least one video identifier and at least one video clip progress identifier, the video identifier is used to indicate a video clip in the first video file, and the video clip progress identifier is used to indicate a completion percentage of a user operation corresponding to the video clip, wherein the user operation is a manual operation performed by the user under guidance of the first video file;

wherein the processor executes the computer program to:

after receiving the first input performed by the user on the target identifier and before the first scratchpad is displayed, display a scratchpad editing interface of the first scratchpad, wherein the scratchpad editing interface comprises a scratchpad content editing area, and the scratchpad content editing area comprises N video identifiers, description information corresponding to each video identifier, and N video clip progress identifiers corresponding to the N video identifiers; wherein N video clips are video clips obtained by dividing the first video file based on the content of the first video file, and N is a positive integer;

wherein the processor executes the computer program to:

receive a third input performed by the user, wherein the third input is an input performed on the first identifier or an input performed on a photographing application icon, and the third input is used to trigger photographing or video recording; and collect an image of a target object in response to the third input, to obtain a first image, and update T video clip progress identifiers of the N video clip progress identifiers based on the first image and the N video clips, wherein the first identifier comprises any one of the N video clip progress identifiers or a second identifier on the scratchpad editing interface, T is a positive integer, and T≤N.

10. The electronic device according to claim 9, wherein the processor executes the computer program to:

receive the first input performed by the user on the target identifier displayed on a video recording interface of the first video file; and display the first scratchpad in a case that an input characteristic of the first input is a preset input characteristic.

11. The electronic device according to claim 9, wherein the scratchpad editing interface further comprises a scratchpad attribute editing area, and the scratchpad attribute editing area comprises at least one scratchpad attribute of the first scratchpad; the processor executes the computer program to:

after displaying the scratchpad editing interface of the first scratchpad, receive a second input performed by the user on the scratchpad attribute editing area; and update at least one scratchpad attribute of the first scratchpad in response to the second input, and generate the first scratchpad based on content in the scratchpad content editing area and the scratchpad attribute editing area, wherein the scratchpad attribute comprises at least one of the following: a scratchpad subject, a scratchpad reminder time, and a scratchpad completion time.

12. The electronic device according to claim 9, wherein the processor executes the computer program to:

determine the $i^{th}$ video clip of the N video clips, and update a video clip progress identifier corresponding to the $i^{th}$ video clip to first progress, wherein a second image in the $i^{th}$ video clip matches the first image, the first progress is a percentage of a video time corresponding to the second image in the $i^{th}$ video clip to total video duration of the $i^{th}$ video clip, i is a positive integer, and i≤N.

13. The electronic device according to claim 12, wherein the processor executes the computer program to:

after determining the $i^{th}$ video clip of the N video clips, in a case that video clip progress identifiers corresponding to S video clips of the first video clip to the $(i-1)^{th}$ video clip have not been updated to a completed state, update the video clip progress identifiers corresponding to the S video clips to second progress, the second progress indicating the completed state, wherein S is a positive integer, and S≤i−1.

14. The electronic device according to claim 12, wherein an entry identifier of at least one scratchpad is displayed on a target interface, the target interface further comprises an overall video progress identifier corresponding to the first scratchpad, and the overall video progress identifier is used to indicate an overall completion percentage of a user operation performed on the first video file; and the processor executes the computer program to:

after updating the video clip progress identifier corresponding to the $i^{th}$ video clip to the first progress, update, based on the first progress, a progress status indicated by the overall video progress identifier.

15. The electronic device according to claim 9, wherein the processor executes the computer program to:

display an entry identifier of at least one scratchpad, and in a case that a fourth input performed by the user on the entry identifier of the first scratchpad is received, display a scratchpad editing interface of the first scratchpad in response to the fourth input, wherein the entry identifier of the at least one scratchpad comprises an entry identifier of the first scratchpad, and the entry identifier of the first scratchpad is determined based on the content of the first video file.

16. The electronic device according to claim 15, wherein the processor executes the computer program to:

receive a fifth input performed by the user on a video thumbnail of a second video file and the scratchpad entry identifier of the first scratchpad; and in response to the fifth input, add, to the first scratchpad, P video identifiers, description information corresponding to each video identifier, and P video clip progress identifiers corresponding to the P video identifiers, wherein P video clips are video clips obtained by dividing the second video file based on content of the second video file, and P is a positive integer.

* * * * *